(12) United States Patent
McCarthy

(10) Patent No.: US 9,467,192 B2
(45) Date of Patent: Oct. 11, 2016

(54) MCM INTEGRATION AND POWER AMPLIFIER MATCHING OF NON-RECIPROCAL DEVICES

(71) Applicant: Broadcom Corporation, Irvine, CA (US)

(72) Inventor: Evan S. McCarthy, Irvine, CA (US)

(*) Notice: Subject to any disclaimer, the term of this patent is extended or adjusted under 35 U.S.C. 154(b) by 157 days.

(21) Appl. No.: 13/927,787

(22) Filed: Jun. 26, 2013

(65) Prior Publication Data

US 2014/0323064 A1 Oct. 30, 2014

Related U.S. Application Data

(60) Provisional application No. 61/817,179, filed on Apr. 29, 2013.

(51) Int. Cl.
| | |
|---|---|
| H01P 1/38 | (2006.01) |
| H04B 1/40 | (2015.01) |
| H01P 1/383 | (2006.01) |
| H01P 1/387 | (2006.01) |
| H01P 11/00 | (2006.01) |

(52) U.S. Cl.
CPC ............. *H04B 1/40* (2013.01); *H01P 1/383* (2013.01); *H01P 1/387* (2013.01); *H01P 11/00* (2013.01)

(58) Field of Classification Search
CPC ............. H01P 1/383; H01P 1/38; H01P 1/32

USPC .................................................. 333/1.1, 24.2
See application file for complete search history.

(56) References Cited

U.S. PATENT DOCUMENTS

| | | | |
|---|---|---|---|
| 6,741,478 B2* | 5/2004 | Shimizu et al. | 361/760 |
| 2002/0079981 A1* | 6/2002 | Tanaka | H01P 1/36 |
| | | | 333/1.1 |
| 2009/0045884 A1* | 2/2009 | Kishimoto | H01P 1/387 |
| | | | 333/24.2 |

* cited by examiner

*Primary Examiner* — Stephen E Jones
(74) *Attorney, Agent, or Firm* — Fiala & Weaver P.L.L.C.

(57) ABSTRACT

Devices are described herein that operate according to non-reciprocal behaviors. The devices may be manufactured and integrated into substrates and discrete components according to described techniques. The devices may be configured in ways to achieve increased device performance while decreasing the overall device size. The devices may be actively tuned to facilitate impedance matching with other circuit components such as power amplifiers. Tuning includes adjustment of magnetic fields and impedance values associated with the devices using techniques and components described herein and may be based upon changes in circuit or device parameters such as temperature, voltage, and current. The devices described herein may be configured as non-reciprocal devices that include ferrites with metallization patterns that may be in the form of microstrip circuitry or in stripline formats depending upon configuration.

12 Claims, 15 Drawing Sheets

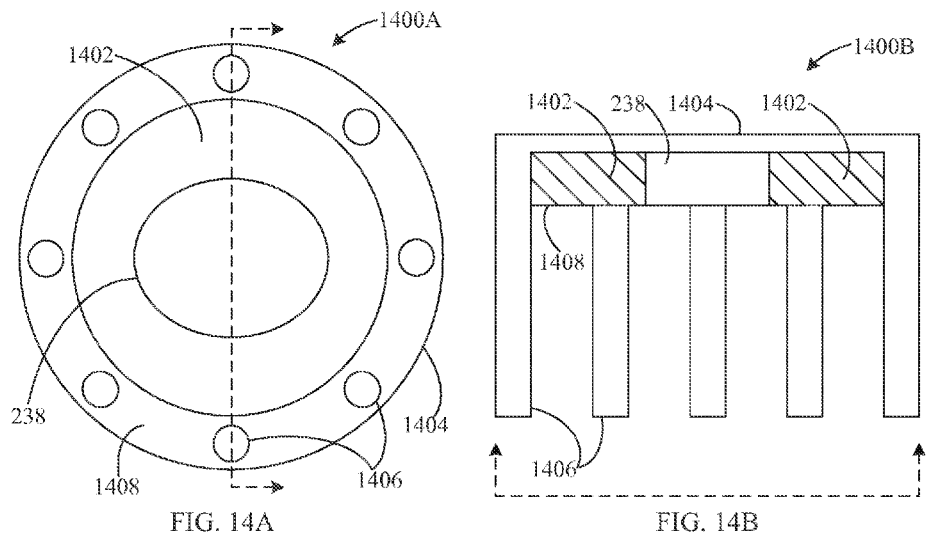
FIG. 14A
FIG. 14B
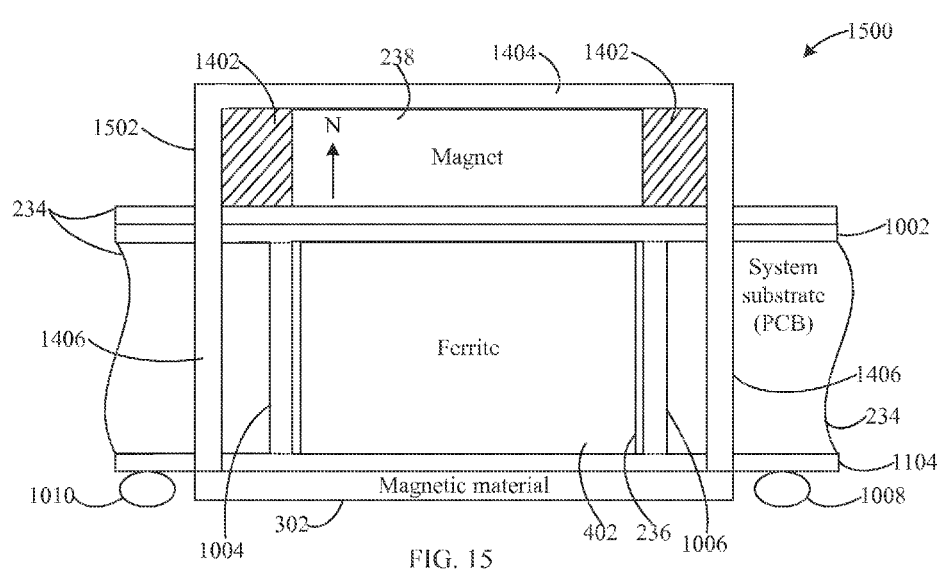
FIG. 15

MCM INTEGRATION AND POWER AMPLIFIER MATCHING OF NON-RECIPROCAL DEVICES

CROSS-REFERENCE TO RELATED APPLICATION(S)

This application claims the benefit of U.S. Provisional Patent Application No. 61/817,179, entitled "MCM Integration and Power Amplifier Matching of Non-Reciprocal Devices," filed Apr. 29, 2013, which is hereby incorporated herein by reference in its entirety and made part of this application for all purposes.

BACKGROUND

1. Technical Field

The subject matter described herein relates to non-reciprocal devices.

2. Background Art

A non-reciprocal device is a device in which signals traveling from a first port of the device to a second port of the device behave differently than signals traveling from the second port of the device to the first port of the device when the device is under electrical bias. Similarly, signals traveling from the first port of the device to a third port of the device behave differently than signals traveling from the third port of the device to the first port of the device. Examples of non-reciprocal devices include, for example and without limitation, circulators and isolators. A circulator exhibits non-reciprocal behavior in that a signal entering a given port of the circulator is transmitted to the next port in rotation and not to other ports of the circulator. For instance, in a three-port circulator having first, second, and third ports, a signal applied to the first port comes out of the second port (and not out of the third port); a signal applied to the second port comes out of the third port (and not out of the first port); and a signal applied to the third port comes out of the first port (and not out of the second port). Signals that are transmitted in accordance with the rotation of the circulator as described above typically experience a 1 dB loss; whereas, signals that are transmitted in the opposite direction (i.e., counter to the rotation) commonly are attenuated by 20 dB or more. The non-reciprocal behavior of a circulator is generated when a magnetic field interacts with a ferrite (e.g., garnet). An isolator may be formed by connecting a port of a circulator to a reference voltage through a resistive component. For instance, the resistive component may be a resistor (e.g., a 50 ohm resistor or an element of similar impedance).

Wireless communication devices, such as those used in telecommunication systems (e.g., cellular phones and smart phones), are devices that transmit and receive communications using antennas. Limited solutions for utilizing circulators in communication devices have been disclosed in the art. One example is described in Jeffrey L. Young et al., "Bandwidth Optimization of an Integrated Microstrip Circulator and Antenna Assembly: Part 1," IEEE Antennas and Propagation Magazine, Vol. 48, No. 6, pp. 47-56, December 2006 and Jeffrey L. Young et al., "Bandwidth Optimization of an Integrated Microstrip Circulator and Antenna Assembly: Part 2," IEEE Antennas and Propagation Magazine, Vol. 49, No. 6, pp. 82-91, February 2007. In this work, Young et al. stated that circulators may be designed with impedance matching for antennas in communication devices. However, the current state of the art lacks solutions for actively tuning circulators during operation based upon changing circuit parameters. The current state of the art also lacks solutions for efficient, large-scale manufacture of circulators.

BRIEF DESCRIPTION OF THE DRAWINGS/FIGURES

The accompanying drawings, which are incorporated herein and form part of the specification, illustrate embodiments of the disclosed technologies and, together with the description, further serve to explain the principals involved and to enable a person skilled in the relevant art(s) to make and use the disclosed technologies.

FIG. 14A is a block diagram of a bottom view of a portion of a magnetic shield can, according to an exemplary embodiment.

FIG. 14B is a block diagram of a cross-section of a portion of the magnetic shield can of FIG. 14A, according to an exemplary embodiment.

FIG. 15 is a block diagram of a cross-section of a portion of an example implementation of a non-reciprocal device embedded in a system substrate with a magnetic shielding can, according to another exemplary embodiment.

Figure 1A:
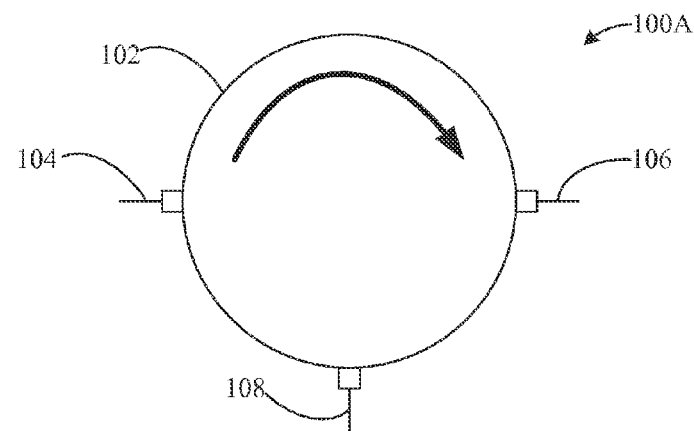
FIG. 1A is a diagram of a non-reciprocal device, according to an exemplary embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Introduction

The following detailed description refers to the accompanying drawings that illustrate example embodiments of the disclosed technologies. However, the scope of the disclosed technologies is not limited to these embodiments, but is instead defined by the appended claims. Thus, embodiments beyond those shown in the accompanying drawings, such as modified versions of the illustrated embodiments, may nevertheless be encompassed by the disclosed technologies.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, descriptive terms used herein such as "about," "approximately," and "substantially" have equivalent meanings and may be used interchangeably.

Still further, it should be noted that illustrated embodiments shown in the figures are not drawn to scale unless specifically noted in this description. That is, illustrated dimensions and angles as shown in the figures are for illustrative purposes and are not considered to be limiting.

Still further, the term "coupled," as used herein, may refer to an association between one or more of circuits, devices, connections, and/or portions thereof. Unless otherwise explicitly set forth, the term "coupled" may mean directly coupled or indirectly coupled in a manner that includes direct or indirect physical, magnetic, and/or electrical coupling, and/or the like. Similarly, "operative" or "operable" coupling include may refer to coupling during the operation of a component or the interaction of different components that includes direct or indirect physical, magnetic, and/or electrical coupling, and/or the like. Likewise, "magnetic" or "electrical" coupling include may refer to coupling involving respective magnetically or electrically related interactions of different components that may be direct or indirect.

Still further, the terms "metallization pattern," "ferrite metallization pattern," "patterned metallization," "non-reciprocal device metallization pattern," and "non-reciprocal device pattern" may be used interchangeably in context of the descriptions provide herein. In embodiments, such patterns may be in the form of microstrip circuitry or in a stripline format depending upon configuration.

Still further, the term "ferrite" as used herein may refer to unbiased or self-biased ferrites. Explicitly noted instances of unbiased or self-biased ferrites in the description below are not to be considered limiting, and are used for illustrative and explanatory purposes.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner 2. Example Embodiments The examples described herein may be adapted to various types of wireless communications systems, e.g., telecommunication systems, computing systems, communication devices, components thereof and/or the like. The examples described herein may also be adapted to various types of integration for non-reciprocal circuits and devices. Furthermore, additional structural and operational embodiments, including modifications/alterations, will become apparent to persons skilled in the relevant art(s) from the teachings herein.

In embodiments, non-reciprocal devices and associated circuitry may be constructed as discrete devices. Discrete non-reciprocal devices are non-reciprocal devices which may be coupled with system-level substrates. Accordingly, discrete non-reciprocal devices may be constructed (e.g., with packaging, shielding, connectors, and/or the like) to allow implementation of the non-reciprocal devices as components to be added to a system. In other embodiments, non-reciprocal devices and associated circuitry may be embedded non-reciprocal devices. Embedded non-reciprocal devices are non-reciprocal devices that may be included within a system-level substrate. For instance, during the fabrication of the system level substrate, an embedded non-reciprocal device may be included. In further embodiments, the exemplary non-reciprocal devices and associated circuitry described herein may be implemented in communication devices and tuned to be impedance matched with transmitters, receivers, and/or antennas in the communication devices.

Circulators are non-reciprocal devices. A circulator exhibits non-reciprocal behavior in that a signal entering a given port of the circulator is transmitted to the next port in rotation and not to other ports of the circulator. For instance, in a three-port circulator having first, second, and third ports, a signal applied to the first port comes out of the second port (and not out of the third port); a signal applied to the second port comes out of the third port (and not out of the first port); and a signal applied to the third port comes out of the first port (and not out of the second port). Signals that are transmitted in accordance with the rotation of the circulator as described above typically experience a 1 dB loss; whereas, signals that are transmitted in the opposite direction (i.e., counter to the rotation) commonly are attenuated by 20 dB or more. The non-reciprocal behavior of a circulator is generated when a magnetic field and/or a radio frequency ("RF") signal interacts with a ferrite.

To achieve optimal non-reciprocal behaviors, circulators should be impedance matched on their ports. Often, components and devices which interact with or are connected to circulators experience impedance variations due to current loads, temperature, and or the like. For example, power amplifiers may have voltage dependent capacitance characteristics or may alter their current outputs but maintain voltage levels, thus causing impedance variations according to Ohm's Law. Similarly, voltage modulations within a system may result in impedance variations. Embodiments described herein may include impedance matching circuits configured to alter circulator parameters or parameters of circuits/components with associated circulators to facilitate tuning and/or impedance matching in order to maintain optimal circulator performance. In such embodiments, the tuning and matching may be performed dynamically. Magnetic field tuning embodiments are also described herein.

While the discussion herein often refers to circulators for purposes of illustration, it will be recognized that such discussion is also applicable to isolators and other types of non-reciprocal devices.

Referring to FIG. 1A, an exemplary diagram of a non-reciprocal device 100A is shown according to an exemplary embodiment. Non-reciprocal device 100A includes a body 102, a first port 104, a second port 106, and a third port 108. Body 102 comprises a ferrite core (not shown) in embodiments, and is shown as having a circular shape only for stylized illustrative purposes. As noted above, a signal input into first port 104 is transmitted to second port 106, but is attenuated and not transmitted to third port 108. Similarly, a signal input into second port 106 is transmitted to third port 108, but is attenuated and not transmitted to first port 104, and a signal input into third port 108 is transmitted to first port 104, but is attenuated and not transmitted to second port 106. It should be noted that connections realized between ports are not shown for clarity, but are described in FIG. 1B below.

Figure 1B:
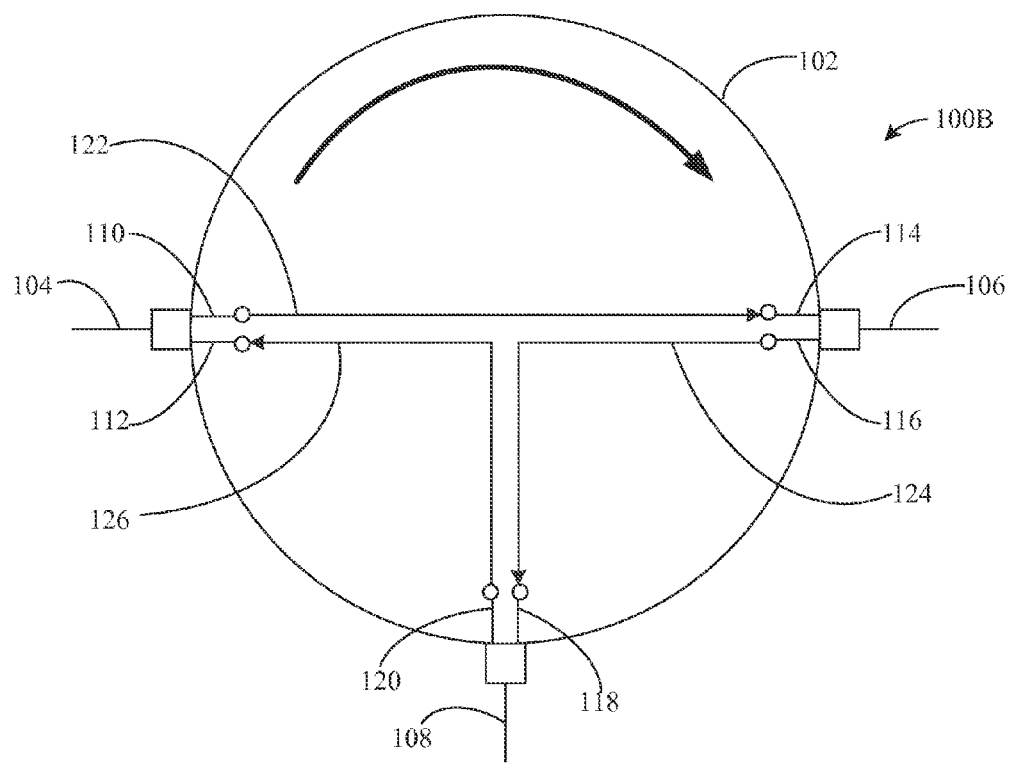
FIG. 1B is a diagram of an example implementation of the non-reciprocal device shown in FIG. 1, according to an exemplary embodiment.

FIG. 1B shows a non-reciprocal device 100B according to embodiments. In some embodiments, non-reciprocal device 100B is a further embodiment of non-reciprocal device 100A shown in FIG. 1A. Non-reciprocal device 100B includes body 102, first port 104, second port 106, and third port 108. Body 102 comprises a ferrite core (not shown, but described in detail in later embodiments herein) in embodiments, and is shown as having a circular shape only for stylized illustrative purposes. First port 104 includes a first terminal 110 and a second terminal 112, second port 106 includes a third terminal 114 and a fourth terminal 116, and third port 108 includes a fifth terminal 118 and a sixth terminal 120. As noted above, a signal input into first port 104 is transmitted to second port 106, but not to third port 108. As shown in FIG. 1B, first terminal 110 is connected to third terminal 114 by a first conductor 122. Likewise, a signal input into second port 106 is transmitted to third port 108, but not to first port 104. Accordingly, fourth terminal 116 is connected to fifth terminal 118 by a second conductor 124. A signal input into third port 108 is transmitted to first port 104, but not to second port 106. Accordingly, sixth terminal 120 is connected to second terminal 112 by a third conductor 126. This non-reciprocal behavior non-reciprocal device 100B is generated when a magnetic field interacts with the ferrite core of body 102.

It should be noted that while first port 104, second port 106, third port 108, first conductor 122, second conductor 124, and third conductor 126 are shown in FIG. 1B as single inputs and single conductors respectively, such illustration is provided for the sake of brevity, and the embodiments herein are not so limited. For instance, one or more of first port 104, second port 106, and/or third port 108 may be differential ports, differential ports comprising a center tap, or any other configuration that would become apparent to one of skill in the relevant art(s) having the benefit of this disclosure. Similarly, one or more of first conductor 122, second conductor 124, and/or third conductor 126 may be differential conductors or any other connection configuration. In embodiments described herein, one or more of first conductor 122, second conductor 124, and/or third conductor 126 may each respectively be wound one or more times around the ferrite core of non-reciprocal device 100B. It should also be noted that the illustrated configuration pattern of first conductor 122, second conductor 124, and third conductor 126 and the corresponding locations of first port 104, second port 106, and third port 108 are exemplary in nature and that other patterns are contemplated such as those shown in the other exemplary, illustrated embodiments herein.

Non-reciprocal device 100A of FIG. 1A and non-reciprocal device 100B of FIG. 1B, and each of the respective components included therein, may include functionality and connectivity beyond what is shown in FIGS. 1A and 1B, as would be apparent to persons skilled in relevant art(s). However, such additional functionality is not shown in FIGS. 1A and 1B for the sake of brevity.

Embodiments presented herein improve manufacture processes and integration of non-reciprocal devices, as well as provide tunable and/or impedance matched non-reciprocal devices for communication devices In embodiments, overall dimension of the described non-reciprocal devices may be less than or equal to 2 mm×2 mm×1 mm, while in other embodiments other dimensions may be used based on design considerations.

For instance, methods, systems, and apparatuses are provided for formation and integration of non-reciprocal devices. In an example aspect, a non-reciprocal device is disclosed. The non-reciprocal device includes a ferrite core and a plurality of conductors that are magnetically operable with the ferrite core. The non-reciprocal device further includes a substrate. The substrate includes a cavity, which is coaxially aligned with the ferrite core.

In another example aspect, a non-reciprocal device is disclosed. The non-reciprocal device includes a device substrate that includes a ferrite material and is configured to be coupled to a system substrate and configured to cover a cavity in the system substrate. The non-reciprocal device also includes a plurality of conductors configured to be magnetically coupled with the ferrite material.

In yet another example aspect, a communication circuit is disclosed. The communication circuit includes a first non-reciprocal device that includes a first port, a second port, and a third port. The communication circuit also includes a first amplifier operably coupled to the first port, the first non-reciprocal device configured to have an impedance that is matched to an impedance of the first amplifier. The communication circuit also includes an antenna configured to be operably coupled to the second port. The communication circuit further includes a first receiver operably coupled to the third port.

Various example embodiments are described in the following subsections. In particular, example discrete non-reciprocal device embodiments are described, followed by example embedded non-reciprocal device embodiments. Next, example embodiments for communication devices are described. Example manufacturing embodiments are subsequently described followed by example operational embodiments. Finally, further embodiments and advantages are described.

3. Example Discrete Non-Reciprocal Device Embodiments

Non-reciprocal devices may be configured in various ways, according to embodiments. One type of configuration is the discrete non-reciprocal device. As noted above, discrete non-reciprocal devices are non-reciprocal devices which may be coupled with system-level substrates. Discrete non-reciprocal devices include stand-alone non-reciprocal devices that may be constructed (e.g., with packaging, shielding, device connectors, and/or the like) to allow implementation of the non-reciprocal devices as components to be added to a system.

A. Example Ferrite Substrate Device Embodiments

Figure 2A:
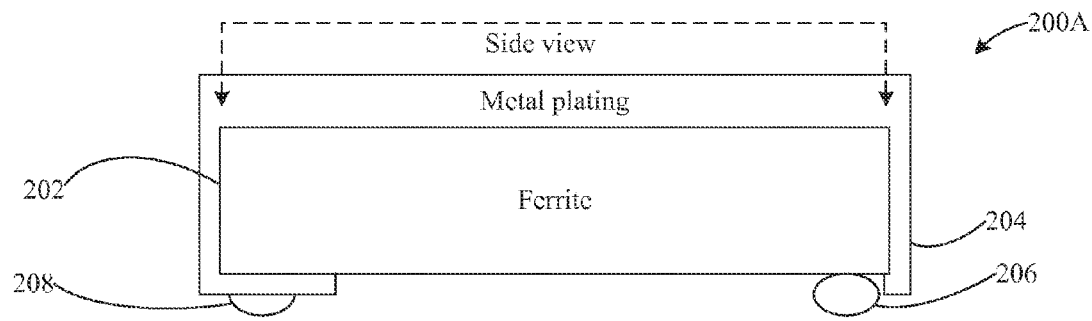
FIG. 2A is a block diagram of a cross-section of a portion of an example implementation of a discrete non-reciprocal device, according to another exemplary embodiment.

Turning to FIG. 2A, an exemplary discrete non-reciprocal device is depicted, according to an embodiment. FIG. 2A shows a cross-sectional side view of a non-reciprocal device 200A. Non-reciprocal device 200A may be a further embodiment of non-reciprocal device 100B of FIG. 1B. Non-reciprocal device 200A includes a ferrite 202, a metal plating 204, a first device connector 206, and a second device connector 208. Non-reciprocal device 200A also includes a first conductor, a second conductor, and a third conductor (each not shown in FIG. 2A, but shown and described in detail with respect to FIG. 2B). In embodiments, ferrite 202 may be referred to as a ferrite material, a ferrite core and/or a ferrite substrate. That is, ferrite 202, as shown, acts as a device substrate upon which components such as metal plating 204, first device connector 206, second device connector 208, and conductors may be placed or attached. Such discrete non-reciprocal devices may be referred to as "lumped element" devices and these in these discrete non-reciprocal devices, ferrite 202 may be referred to as a device substrate.

Ferrite 202 is shown in FIG. 2A as a rectangular prism although it is contemplated that in embodiments, ferrite 202 may be shaped differently. As depicted, metal plating 204 encloses, or substantially encloses ferrite 202. In embodiments, the top, left, right, front, and/or back sides of ferrite 202 may be covered by metal plating 204, while the bottom side of ferrite 202 may be uncovered or partially covered by metal plating 204. In embodiments described herein that include metallization patterns on multiple surfaces of a ferrite, metal plating 204 may be omitted from a surface that includes a metallization pattern. For instance, in some embodiments, the top and bottom sides of ferrite 202 may include the same, or different, metallization patterns. Metal plating 204 may be configured to, or have a composition that, provides magnetic shielding for ferrite 202. In embodiments, the combination of metal plating 204 and one or more of device connectors (e.g., first device connector 206) may comprise a magnetic shielding layer that partially, substantially, or completely encloses ferrite 202 in a "cage." Metal plating 204 may have a thickness that is uniform or varies, and may have any appropriate thickness as would be understood by a person of skill in the relevant art(s) having the benefit of this disclosure. In embodiments, metal plating 204 may be electrically coupled to a reference voltage such as system ground and may be referred to as a reference voltage conductor. The coupling to the reference voltage may be done through a capacitor or matching network as described elsewhere herein, according to embodiments.

First device connector 206 and second device connector 208 may be any connector component such as solder balls (e.g., one solder ball, a plurality of solder balls, a ball grid array (BGA), etc.), pins, surface mount pads, epoxy, and/or the like. First device connector 206 and second device connector 208 may be attached to ferrite 202 and/or metal plating 204 by any conventional techniques. For example, first device connector 206 is shown as attached to ferrite 202, while second device connector 208 is shown as extending through metal plating 206 to ferrite 202. In embodiments, first device connector 206 and/or second device connector 208 may be connected to metal plating 206 and not to ferrite 202. First device connector 206 and second device connector 208 may be configured to allow non-reciprocal device 200A to be mounted, affixed, attached, operably coupled, and/or mechanically coupled to a system substrate, as shown in, and described with respect to, FIG. 2C. In embodiments, additional device connectors may be included in non-reciprocal device 200A. For example, additional device connectors may be included so that at least one connector for each endpoint of the first conductor, the second conductor, and the third conductor (described in detail with respect to FIG. 2B) are included. In such embodiments, the included device connectors may be respectively connected to one or more conductors for providing input signals or connections to reference voltages such as a system ground voltage.

In operation, non-reciprocal device 200A may be biased by a magnetic field from a magnetic source, such as a magnet, solenoid, conductive coil, and/or the like. In embodiments, the magnetic source may be operably and/or magnetically coupled to ferrite 202 through the surface of ferrite 202 that is not covered by metal plating 204. In other embodiments where ferrite 202 is substantially covered by metal plating 204, ferrite 202 may be biased through metal plating 204. When the magnetic field biases ferrite 202, the non-reciprocal device behavior described above is introduced into non-reciprocal device 200A as will be described in further detail below.

Figure 2B:
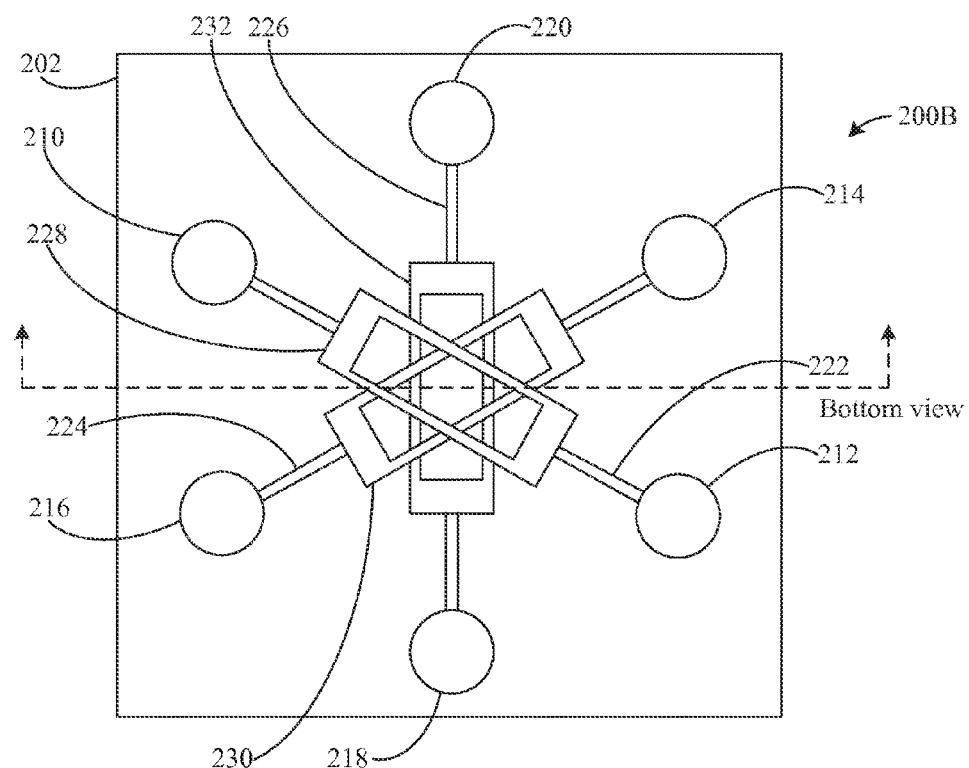
FIG. 2B is a block diagram of a bottom view of the portion of the example implementation of a discrete non-reciprocal device shown in FIG. 2A, according to another exemplary embodiment.

FIG. 2B shows a bottom view of non-reciprocal device 200A as non-reciprocal device 200B. Non-reciprocal device 200B (bottom view) is shown without metal plating 204 for illustrative purposes, though it should be noted that in embodiments metal plating 204 may be electrically/conductively coupled to one or more reference connectors as described herein. Non-reciprocal device 200B includes ferrite 202, as also shown in FIG. 2A, and also includes a metallization pattern described as follows.

Non-reciprocal device 200B also includes a first port 210 and a first reference connector 212. First port 210 and first reference connector 212 are positioned at approximately opposite sides of ferrite 202 and are connected by a first conductor 222. Non-reciprocal device 200B also includes a second port 214 and a second reference connector 216. Second port 214 and second reference connector 216 are positioned at approximately opposite sides of ferrite 202 and are connected by a second conductor 224. Non-reciprocal device 200B also includes a third port 218 and a third reference connector 220. Third port 218 and third reference connector 220 are positioned at approximately opposite sides of ferrite 202 and are connected by a third conductor 226.

As shown, first port 210, second port 214, and third port 218 are substantially equally spaced from each other at approximately 120 degree intervals, although other spacing configurations are contemplated herein. Similarly, first reference connector 212, second reference connector 216, and third reference connector 220 are substantially equally spaced from each other at approximately 120 degree intervals, although other spacing configurations are contemplated herein. It should also be noted that the illustrated configuration pattern of first conductor 222, second conductor 224, and third conductor 226 is approximately symmetrical and that these conductors are illustrated as being substantially axially linear, however, other configurations and shapes are contemplated herein. According to embodiments, first conductor 222, second conductor 224, and third conductor 226 may comprise one or more electrically conductive materials (e.g., conductive metals) in the form of wires, traces, other patterned materials, and/or the like, and may be embedded in the surface of ferrite 202 or patterned on the surface of ferrite 202. In embodiments described herein, first conductor 222, second conductor 224, and third conductor 226 may be located on or near the top surface of ferrite 202, the bottom surface of ferrite 202, and/or any other surface(s) of ferrite 202. For example, in embodiments described herein, one or more of first conductor 222, second conductor 224, and/or third conductor 226 may each respectively be wound one or more times around the ferrite core of non-reciprocal device 200B. Furthermore, first conductor 222, second conductor 224, and third conductor 226 may have respective lengths, widths, and heights that provide desired magnetic and signal characteristics according to design considerations such as non-reciprocal device performance, impedance matching, signal bandwidth, and/or the like, and it is contemplated that the respective conductors may differ in one or more dimensions with respect to each other. In embodiments, first conductor 222, second conductor 224, and third conductor 226 may include a first pattern loop 228, a second pattern loop 230, and a third pattern loop 232 respectively, and the shapes and dimensions of each pattern loop may be configured as shown in FIG. 2B or in other configurations for producing non-reciprocal, non-reciprocal device behaviors. As shown, first conductor 222, second conductor 224, and third conductor 226, and their respective ports and reference connectors, are patterned on the bottom of ferrite 202, although other patterning locations are contemplated in embodiments herein such as, for example, between two ferrite components comprising an exemplary ferrite 202, or on the top and bottom surfaces of ferrite 202, for example, as in the embodiment with multiple windings described above.

According to embodiments, first reference connector 212, second reference connector 216, and third reference connector 220 may be connected to one or more to reference voltages such as a system ground voltage. For instance, one or more of these device connectors may be electrically coupled to metal plating 204 of FIG. 2A (which in embodiments may be connected to a reference voltage), coupled to a reference voltage through one or more of first device connector 206 and second device connector 208 of FIG. 2A, and/or other device connectors not shown, and/or coupled to a reference voltage by other connections as would be apparent to one of skill in the relevant art(s) having the benefit of this disclosure. In some embodiments, first reference connector 212, second reference connector 216, and/or third reference connector 220 may be connected to one or more reference voltages (such as first device connector 206 and second device connector 208 of FIG. 2A, and/or other device connectors not shown) using plated or conductive vias through ferrite 202.

In embodiments, patterned metallization formation (e.g., the forming of first conductor 222, second conductor 224, third conductor 226, first pattern loop 228, second pattern loop 230, and/or third pattern loop 232) may be performed utilizing metal deposition (e.g., selective metal deposition) techniques and/or photolithography techniques such as formation of a redistribution layer ("RDL") or an integrated passive device ("IPD") type process for low-cost non-reciprocal device metallization.

In operation, non-reciprocal device 200B may perform similarly to non-reciprocal device 100B of FIG. 1B and non-reciprocal device 200A of FIG. 2A described above. According to embodiments, first port 210, second port 214, and third port 218 may respectively correspond to first port 104, second port 106, and third port 108 of non-reciprocal device 100B as shown in FIG. 1B. When ferrite 202 is biased, e.g., by a magnet, the non-reciprocal device behavior described herein is introduced into non-reciprocal device 200B. For instance, first port 210, second port 214, and third port 218 may each respectively correspond to a port of a three-port non-reciprocal device.

Figure 2C:
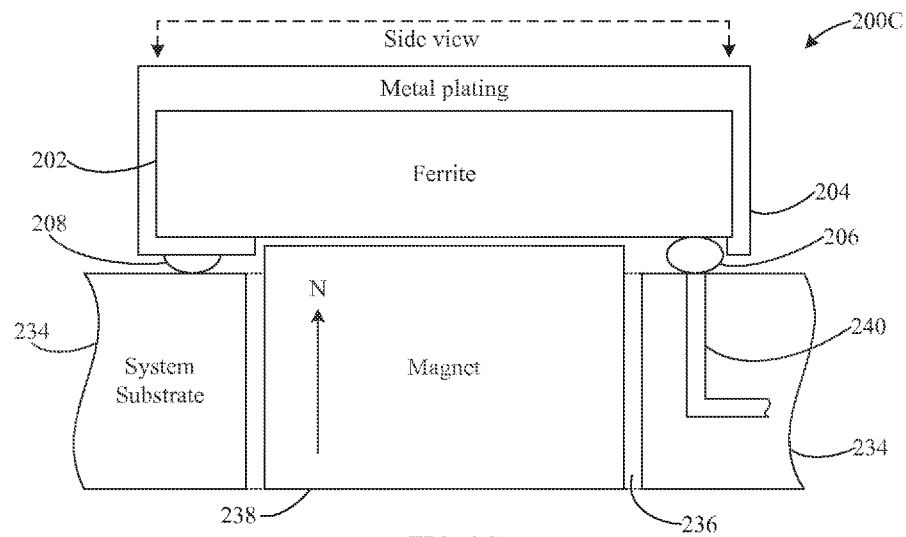
FIG. 2C is a block diagram of a cross-section of a portion of an example implementation of a mounted discrete non-reciprocal device as shown in FIG. 2A, according to another exemplary embodiment.

As noted above, non-reciprocal device embodiments described herein may be implemented in various ways. For instance, FIG. 2C shows a cross-sectional side view of a discrete non-reciprocal device implementation, according to an exemplary embodiment. Non-reciprocal device 200C is depicted as being placed on a system substrate 234. In embodiments, non-reciprocal device 200C is a further embodiment of non-reciprocal device 200A of FIG. 2A and non-reciprocal device 200B of FIG. 2B. Non-reciprocal device 200C may be coupled to system substrate 234 by one or more device connectors (e.g., first device connector 206, second device connector 208, and/or additional device connectors not shown). While shown in FIG. 2C as including a single substrate layer, system substrate 234 may include one or more substrate layers and/or one or more metal layers as described elsewhere herein (e.g., similarly as described for device substrate 802 of FIG. 8), according to embodiments. Furthermore, in some embodiments in which system substrate 234 includes a cavity for housing a magnetic source, as described below, the substrate layer(s) in which the cavity is formed may include one or more sub-layers of substrate material and/or one or more metal layers. A magnetic source such as a magnet 238 may bias ferrite 202 in embodiments to induce non-reciprocal device behavior as described herein. At least a portion of the magnetic source (e.g., magnet 238) may be included within a cavity 236 in system substrate 234, as shown in FIG. 2C, according to embodiments. Cavity 236 may be plated in one or more embodiments. It should be noted that the overall height of non-reciprocal device 200C in such a configuration (e.g., with non-reciprocal device 200 coupled to system substrate 234 and to magnet 238 in cavity 236) may be reduced compared to other configurations. Magnet 238 may be in direct or indirect contact with ferrite 202, may substantially planar with the top and/or the bottom of system substrate 234, and/or may be recessed within cavity 236. In embodiments, and insulating layer (not shown) such as a dielectric layer or spacer material may separate magnet 238 from ferrite 202 and its patterned metallization.

System substrate 234 includes a signal connection 240 communicatively coupled to first device connector 206. In embodiments, signal inputs to non-reciprocal device 200C (e.g., a signal input to first port 210 shown in FIG. 2B) may be transmitted through first device connector 206 and signal connection 240 from system components in, on, or connected to, system substrate 234. While only one signal connection is shown (i.e., signal connection 234) for sake of brevity and illustrative clarity, it is contemplated that additional signal connections may be included in or on system substrate 234. For example, two additional signal connections may be included in system substrate 234 (e.g., one signal connection for second port 214 of FIG. 2B, and one signal connection for third port 218 of FIG. 2B).

Non-reciprocal device 200A of FIG. 2A, non-reciprocal device 200B of FIG. 2B, and non-reciprocal device 200C of FIG. 2C, and each of the respective components included therein or in association therewith, may include functionality and connectivity beyond what is shown in FIGS. 2A, 2B, and 2C, as would be apparent to persons skilled in relevant art(s). However, such additional functionality is not shown in FIGS. 2A, 2B, and 2C for the sake of brevity.

According to various configurations in exemplary embodiments, non-reciprocal devices may include a magnetic material such as steel, iron, a permalloy, magnets, and/or the like. These magnetic materials may be placed in configurations within, or in conjunction with, non-reciprocal devices to allow for management (e.g., control, containment, and/or improving uniformity) of fields produced by magnetic sources that are applied to the non-reciprocal devices and the ferrites therein.

Figure 3:
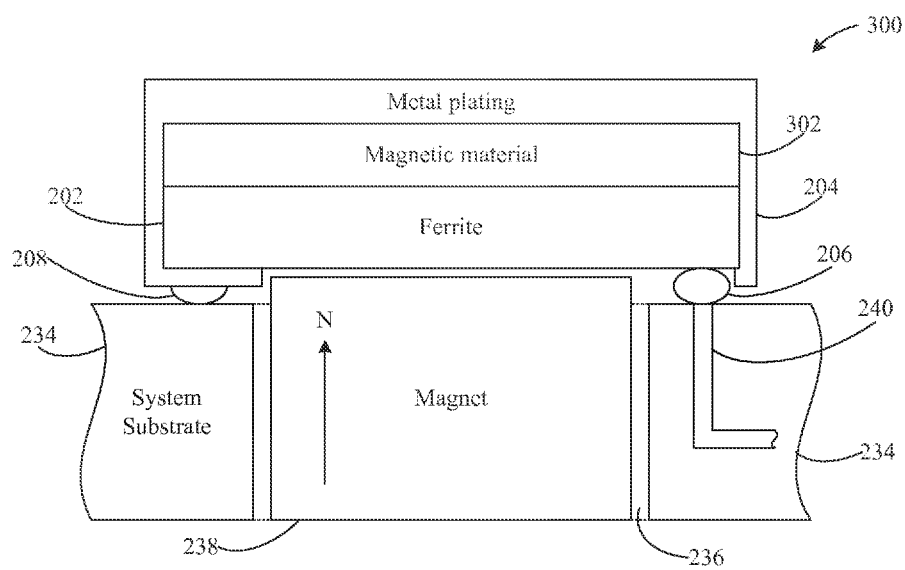
FIG. 3 is a block diagram of a cross-section of a portion of an example implementation of a discrete non-reciprocal device, according to another exemplary embodiment.

For example, FIG. 3 depicts an exemplary discrete non-reciprocal device comprising a magnetic material. FIG. 3 shows a non-reciprocal device 300, and in embodiments, non-reciprocal device 300 may be a further embodiment of previously described non-reciprocal device 200A of FIG. 2A, non-reciprocal device 200B of FIG. 2B, and/or non-reciprocal device 200C of FIG. 2B. For instance, non-reciprocal device 300 includes the components of non-reciprocal device 200C and its associated system substrate and magnetic source. In addition, non-reciprocal device 300 includes a magnetic material 302.

According to embodiments, magnetic material 302 may be composed, configured and/or positioned to manage field(s) produced by a magnetic source(s), e.g., magnet 238. For example, by positioning magnetic material 302 in non-reciprocal device 300 so that ferrite 202 is between magnet 238 and magnetic material 302, the magnetic field produced by magnet 238 may be more optimally directed through ferrite 202 due to the "image magnet" effect produced in magnetic material 302 by the magnetic field. As shown in FIG. 3, magnetic material 302 is located in non-reciprocal device 300 between ferrite 202 and metal plating 204. In embodiments, magnetic material 302 is located such that magnetic material 302 is in direct contact or indirect contact (e.g., through an insulating material not shown) with ferrite 202. It is also contemplated that in embodiments, magnetic material 302 may be positioned above and/or on metal plating 204 (or in other configurations where magnetic material 302 is not in direct contact with ferrite 202). Furthermore, the length and the width, and/or the shape, of magnetic material 302 may correspond (e.g., be substantially similar), to ferrite 202, to magnet 238, or may be some other dimension corresponding to design considerations and/or the performance of non-reciprocal device 300. The height of magnetic material 302 may be based upon design considerations and/or the performance of non-reciprocal device 300, the size of magnet 238, the magnetic field strength of magnet 238, and/or other considerations related to non-reciprocal device 300. In an exemplary embodiment, the length and the width of magnetic material 238 may be approximately the same as the length and width of magnet 238 to limit the magnetic field of magnet 238.

Non-reciprocal device 300 of FIG. 3 and each of the components included therein or in association therewith, may include functionality and connectivity beyond what is shown in FIG. 3, as would be apparent to persons skilled in relevant art(s). However, such additional functionality is not shown in FIG. 3 for the sake of brevity.

B. Example Conglomerate Substrate Embodiments

Figure 4:
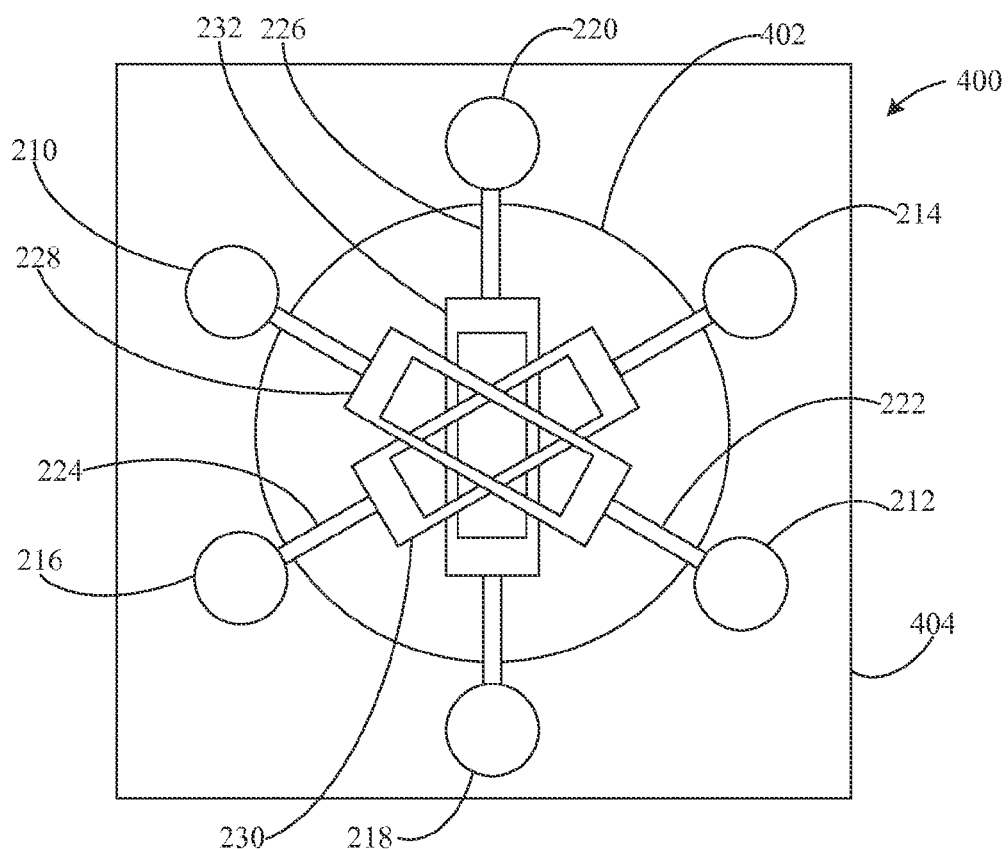
FIG. 4 is a block diagram of a bottom view of a portion of an example implementation of a discrete non-reciprocal device, according to an exemplary embodiment.

Turning now to FIG. 4, an exemplary discrete non-reciprocal device embodiment is shown. FIG. 4 shows a non-reciprocal device 400 that may be a further embodiment of non-reciprocal device 200B of FIG. 2B and non-reciprocal device 300 of FIG. 3. For instance, non-reciprocal device 400 includes the components of non-reciprocal device 200B. However, the configuration of non-reciprocal device 400 may differ from non-reciprocal device 200B in at least the following described ways.

For instance, non-reciprocal device 400 includes a ferrite 402, but as shown, ferrite 402 is not a ferrite substrate or lumped element ferrite like ferrite 202. As shown, ferrite 402 is embedded in a device substrate 404. In the illustrated embodiment, ferrite 402 has a length dimension and a width dimension that are less than the length dimension and width dimension of device substrate 404. In embodiments, ferrite 402 may be sized such that each of first port 210, second port 214, third port 218, first reference connector 212, second reference connector 216, and third reference connector 220 lies outside the perimeter of ferrite 402, e.g., as shown in FIG. 4. It is contemplated that ferrite 402 and device substrate 404 may comprise any dimensions, size, and/or shape, as would be apparent to persons skilled in relevant art(s) having the benefit of this disclosure.

Device substrate 404 may comprise one or more substrate materials (i.e., a conglomerate material). Substrate materials may include, but are not limited to, epoxy(ies), injection mold material(s), silicon or dielectric material(s), plastic(s), polymer material(s), and/or the like. In one embodiment, ferrite 402 and device substrate may be joined by inserting ferrite 402 into an injection mold. In some configurations, the top and bottom surfaces of ferrite 402 may respectively be substantially planar with the top and bottom surfaces of device substrate 404, while other configurations may be non-planar for one or both surfaces of ferrite 402. For example, the surface of ferrite 402 that is to be coupled with a magnetic material (e.g., magnetic material 302 as shown in FIG. 3) may not be planar and may be beneath the corresponding surface of device substrate 404 and thus substrate 404 also may act as an insulating layer between ferrite 402 and the magnetic material, according to an embodiment.

In some embodiments, ferrite 402 may be placed within device substrate 404 during or after the manufacture of device substrate 404 and may be affixed to device substrate 404 by any known techniques such as epoxy, glue, force-fitting, clips, covering components, etc.

Device substrate 404 may also include one or more plated or conductive vias (not shown) configured to connect first reference connector 212, second reference connector 216, and/or third reference connector 220 to a reference voltage and to act as a magnetic shield or cage for non-reciprocal device 400 (discussed in further detail below with respect to FIG. 7). In embodiments, a plurality of plated or conductive vias may be included proximate the perimeter of ferrite 402.

Figure 5:
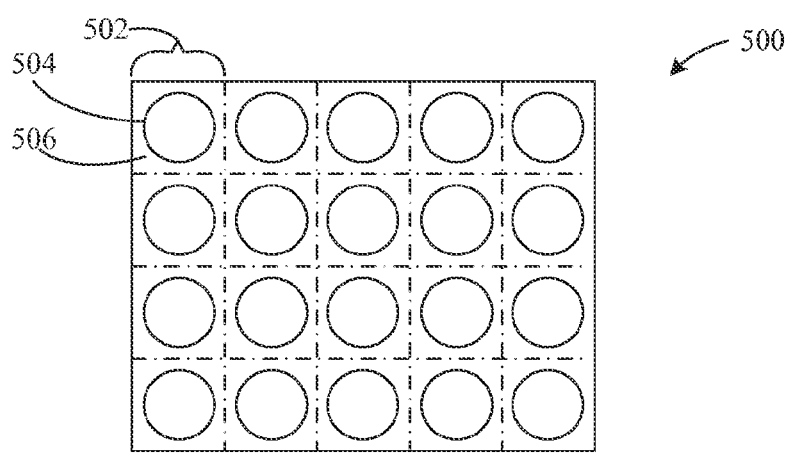
FIG. 5 is a block diagram of an embedded ferrite panel, according to an exemplary embodiment.

The configuration of non-reciprocal device 400 may allow for reduced non-reciprocal device costs. For instance, less ferrite material may be used for ferrite 402 compared with ferrite 202 of FIG. 2B and substrate materials may cost less than ferrite materials. The embodiments described with respect to non-reciprocal device 400 may also allow for more efficient manufacturing of discrete non-reciprocal devices compared with the previously described non-reciprocal devices. For example, FIG. 5 shows a wafer 500 that may be manufactured according to the configuration of non-reciprocal device 400. Wafer 500 includes a plurality of substrate portions 502. Each substrate portion 502 may correspond to the joined ferrite 402 and device substrate 404 shown in FIG. 4, where each substrate portion includes a ferrite 504 and a device substrate 506 that may be comprised of one or more substrate materials described above with respect to FIG. 4. Wafer 500 may be divided (diced or cut) into individual substrate portions 502 using standard cutting techniques. In embodiments, substrate portions 502 may each correspond to non-reciprocal device 400 of FIG. 4. That is, discrete non-reciprocal devices may be mass-produced, e.g., in wafer form, as shown in FIG. 5. It should be noted that wafer 500 may include fewer or more substrate portions 502 than are shown in FIG. 5 in embodiments.

It is contemplated that the configuration of non-reciprocal device 400 as shown in FIG. 4 may be applicable to various embodiments described herein. For example, embodiments described in this section, as well as embodiments described in other following sections, may utilize the configuration of conductors, ports, connectors, ferrite, and/or vias described with respect to non-reciprocal device 400.

Non-reciprocal device 400 of FIG. 4 and each of the components included therein or in association therewith, may include functionality and connectivity beyond what is shown in FIG. 4, as would be apparent to persons skilled in relevant art(s). However, such additional functionality is not shown in FIG. 4 for the sake of brevity.

Figure 6:
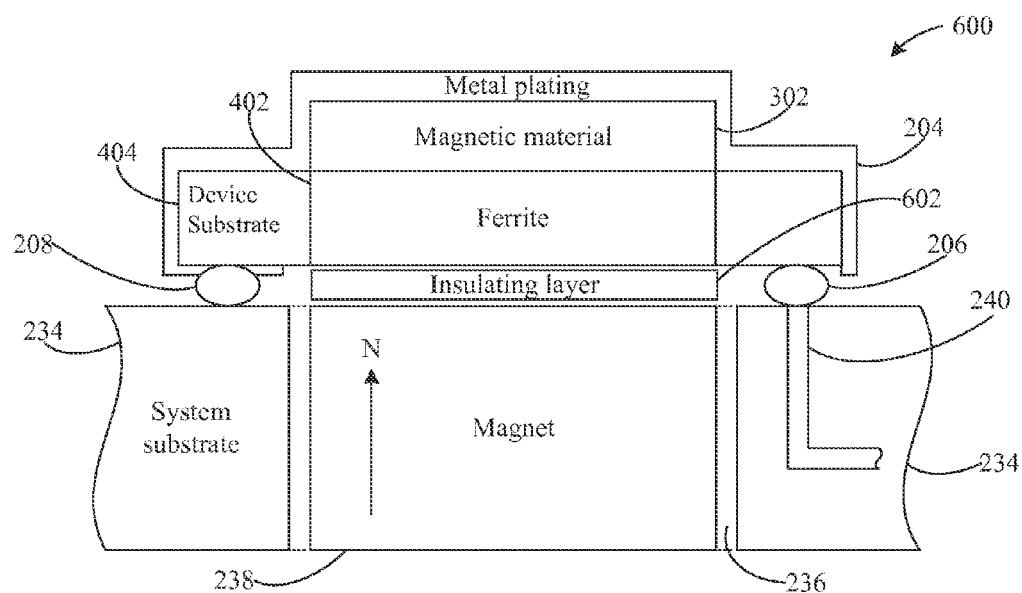
FIG. 6 is a block diagram of a cross-section of a portion of an example implementation of a discrete non-reciprocal device shown in FIG. 4, according to another exemplary embodiment.

FIG. 6 depicts a cross-sectional view of an exemplary discrete non-reciprocal device that includes a conglomerate substrate. FIG. 6 shows a non-reciprocal device 600, and in embodiments, non-reciprocal device 600 may be a further embodiment of previously described non-reciprocal device 400 of FIG. 4. For instance, non-reciprocal device 600 includes the components of non-reciprocal device 300 and non-reciprocal device 400 and their associated system substrates and magnetic sources. In addition, non-reciprocal device 300 includes an optional insulating layer 602.

As shown, non-reciprocal device 600 includes ferrite 402 and device substrate 404, similarly configured as in non-reciprocal device 400 of FIG. 4. In the depicted embodiment, the shape and size of ferrite 402 is substantially similar to magnet 238 and to magnetic material 302. Insulating layer 602 may be composed of a dielectric material(s), a non-conductive material(s), and/or spacer material(s) and may separate magnet 238 from ferrite 202 and its patterned metallization.

Non-reciprocal device 600 of FIG. 6 and each of the components included therein or in association therewith, may include functionality and connectivity beyond what is shown in FIG. 6, as would be apparent to persons skilled in relevant art(s). However, such additional functionality is not shown in FIG. 6 for the sake of brevity.

Figure 7:
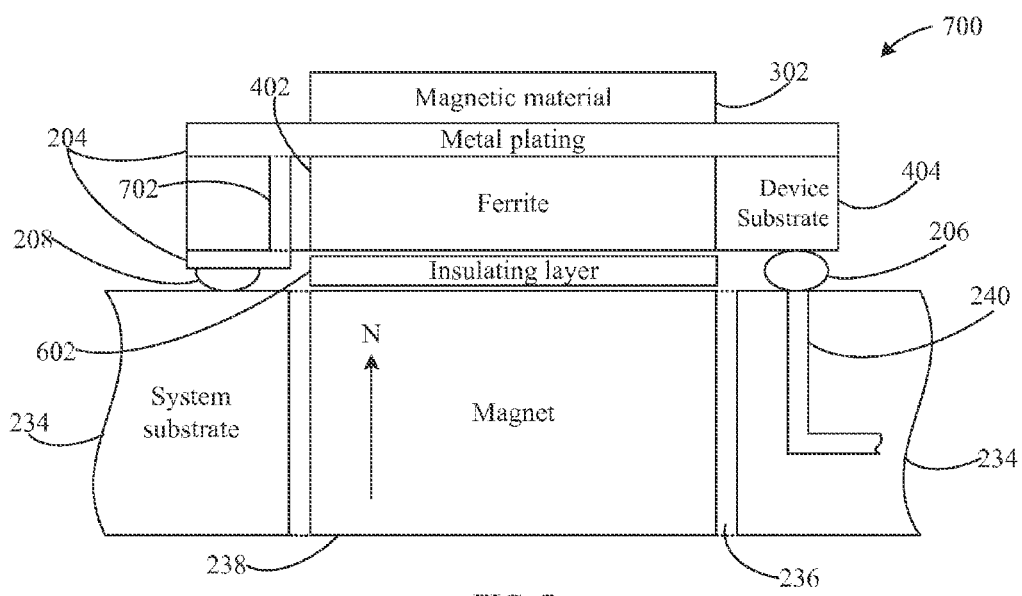
FIG. 7 is a block diagram of a cross-section of a portion of an example implementation of a discrete non-reciprocal device shown in FIG. 4, according to another exemplary embodiment.

FIG. 7 depicts a cross-sectional view of an exemplary discrete non-reciprocal device that includes a conglomerate substrate. FIG. 7 shows a non-reciprocal device 700, and in embodiments, non-reciprocal device 700 may be a further embodiment of previously described non-reciprocal device 600 of FIG. 6. For instance, non-reciprocal device 700 includes the components of non-reciprocal device 600 and its associated system substrate and magnetic source. In addition, non-reciprocal device 700 includes a reference via 702. In embodiments, a plurality of reference vias 702 may be included in device substrate 404 and configured similarly to the depicted reference via 702.

As shown, non-reciprocal device 700 includes ferrite 402 and device substrate 404, similarly configured as in non-reciprocal device 400 of FIG. 4 and non-reciprocal device 600 of FIG. 6. In the depicted embodiment, the shape and size of ferrite 402 is substantially similar to magnet 238 and to magnetic material 302. Reference via 702 may be a via as described above with respect to FIGS. 2A and 4. Reference via 702 may be a plated or conductive via configured to provide an electrical path from one surface of device substrate 404 to another. For instance, reference via 702 may provide a conductive connection between metal plating 204 and second device connector 208 which may be connected to a reference voltage. It should be noted that in the depicted embodiment of FIG. 7, metal plating 204 extends over the top side of ferrite 402 and device substrate 404, and over a portion of the bottom side of device substrate 404, but does not extend over the left and right sides of device substrate 404. Reference via 702 is configured to provide an electric shielding cage around ferrite 402. Additional reference vias 702 may be included in device substrate 404 to increase shielding efficacy. Sufficient magnetic shielding provided by one or more reference vias 702 may render metal plating (e.g., metal plating 204) over the left and right sides of device substrate 404 unnecessary. This may eliminate the need for masking of the device connector areas (e.g., with a resistive material, as described in the manufacturing embodiments below). It is also contemplated that, in embodiments, metal plating 204 may be included over the left and right sides of device substrate 404 in addition to including one or more reference vias 702. In some embodiments, reference via 702 may be non-plated or non-conductive but may include a separate conductor that traverses reference via 702.

Non-reciprocal device 700 of FIG. 7 and each of the components included therein or in association therewith, may include functionality and connectivity beyond what is shown in FIG. 7, as would be apparent to persons skilled in relevant art(s). However, such additional functionality is not shown in FIG. 7 for the sake of brevity.

C. Example Printed Circuit Board Embodiments

In some example embodiments, discrete non-reciprocal devices may include printed circuit board (PCB) device substrates and/or the like. The manufacture of unmodified PCB device substrates may be performed in any standard fashion. For example, a PCB substrate made of flame retardant ("FR-4") material (e.g., with conductive material, fiberglass, and epoxy composition) may be used. PCB substrate manufacturing may be cost-efficient and allow for mass-processing of discrete non-reciprocal devices. In embodiments, discrete non-reciprocal devices with PCB device substrates may be configured in similar manners as shown for the conglomerate device substrate embodiments above. PCB device substrates may offer additional benefits as well, such as multiple conductive layers that may act as shielding and electrically connective media, and secondary, tertiary, etc., substrate portions as will be described in this subsection.

Figure 8:
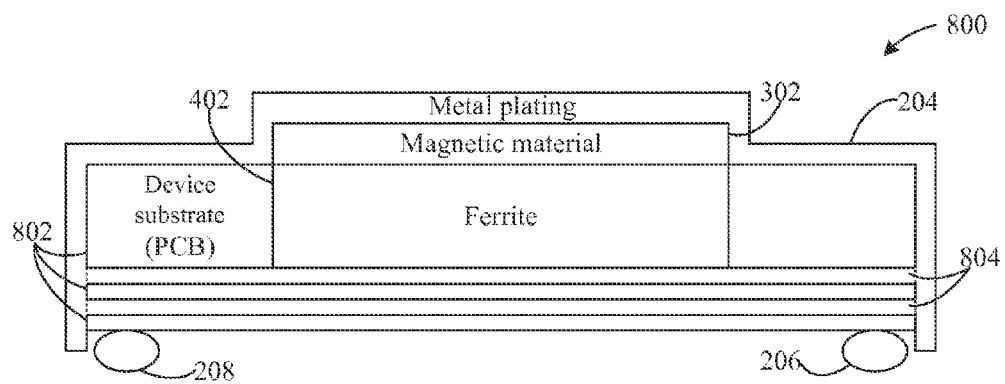
FIG. 8 is a block diagram of a cross-section of a portion of an example implementation of a non-reciprocal device embedded in a system substrate, according to an exemplary embodiment.

Turning now to FIG. 8, an exemplary discrete non-reciprocal device embodiment is shown. FIG. 8 shows a non-reciprocal device 800 that may be a further embodiment of non-reciprocal device 400 of FIG. 4, non-reciprocal device 600 of FIG. 6, and/or non-reciprocal device 700 of FIG. 7. For instance, non-reciprocal device 800 includes the components: metal plating 204, first reference connector 206, second reference connector 208, magnetic material 302, and ferrite 402. However, the configuration of non-reciprocal device 800 may differ from embodiments described in the previous subsections in at least the following described ways.

Non-reciprocal device 800 includes a device substrate 802 and metal layers 804 within device substrate 802. Accordingly, device substrate 802 may be composed of multiple sub-layers of device substrate material between or outside of metal layers 804 as shown in FIG. 8, and sub-layers may be positions above and/or below ferrite 402. The number and position of the illustrated sub-layers is exemplary and variations are contemplated in various embodiments. Metal layers 804 may be composed of copper and/or any other electrically conductive material and in embodiments, the sub-layers of device substrate material and metal layers 804 may be referred to as device substrate 802. As shown, ferrite 402 is embedded in a hole, recess, or cavity of device substrate 802 on the top sub-layer. While shown as extending through the entire depth of the top sub-layer, in embodiments the recess or cavity in which ferrite 402 is located may extend through less than the entire depth of the top sub-layer. Ferrite 402 may be placed within device substrate 802 during or after the manufacture of device substrate 802 and may be affixed to device substrate 802 by any known techniques such as epoxy, glue, force-fitting, clips, covering components, etc. It is also contemplated that ferrite 402 may reside in any internal sub-layer or in any external sub-layer of device substrate 802. Likewise, patterned metallization (e.g., first conductor 222, second conductor 224, and third conductor 226) may be patterned on ferrite 402 or may be in a sub-layer of device substrate 802. For example, patterned metallization may be located in any sub-layer of device substrate 804, according to embodiments.

Non-reciprocal device 800 may be coupled with a magnetic source (e.g., magnet 238) and/or a system substrate (e.g., system substrate 234), in a manner similar to embodiments described herein. Furthermore, in embodiments, many device substrates 802, device substrates 802 joined with ferrites 402, and/or non-reciprocal devices 800 may be manufactured on a wafer or panel similar to the process described with respect to wafer 500 of FIG. 5 above, where the wafer is manufactured according to PCB processing techniques.

Non-reciprocal device 800 of FIG. 8 and each of the components included therein or in association therewith, may include functionality and connectivity beyond what is shown in FIG. 8, as would be apparent to persons skilled in relevant art(s). However, such additional functionality is not shown in FIG. 8 for the sake of brevity.

Figure 9:
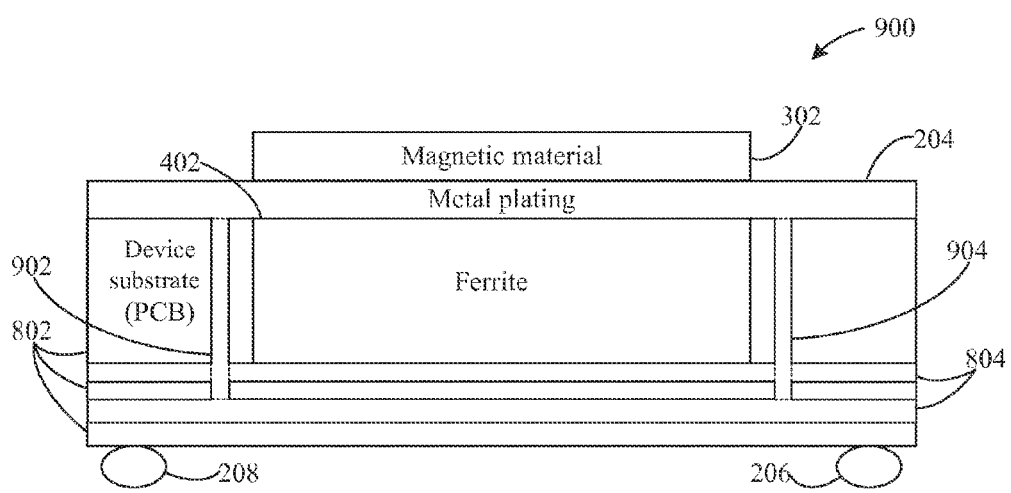
FIG. 9 is a block diagram of a cross-section of a portion of an example implementation of a non-reciprocal device embedded in a system substrate, according to another exemplary embodiment.

FIG. 9 shows an exemplary discrete non-reciprocal device that includes a non-reciprocal device 900 that may be a further embodiment of non-reciprocal device 700 of FIG. 7 and non-reciprocal device 800 of FIG. 8. For instance, non-reciprocal device 900 includes the components of non-reciprocal device 800 and includes a reference via 902, a reference via 904, and magnetic material 302 located above metal plating 204 as in non-reciprocal device 700. However, the configuration of non-reciprocal device 900 may differ from embodiments described in the previous subsections in at least the following described ways.

For example, as described above, PCB device substrate 802 may include one or more metal layers 804 as described with respect to FIG. 8 above, and sub-layers may be positions above and/or below ferrite 402. As shown in FIG. 9, reference via 902 and reference via 904 extend through both illustrated metal layers 804 of device substrate 802, however it is contemplated that in embodiments, reference via 902 and/or reference via 904 may extend through one or more metal layers 804. Reference via 902 and reference via 904 may be configured to provide electrical connectivity to metal layers 804 through which reference via 902 and reference via 904 pass or contact and to metal plating 204. Similar to reference via 702 of FIG. 7, reference via 902 and reference via 904 are configured to provide an electric shielding cage around ferrite 402. Additional reference vias not shown in the depicted cross-section of non-reciprocal device 900 may be included in device substrate 802 to increase shielding efficacy. Sufficient magnetic shielding provided by one or more reference vias (e.g., reference vias 902 and 904) may render metal plating (e.g., metal plating 204) over the left and right sides of device substrate 802 unnecessary, but in embodiments, metal plating 204 may be included over the left and right sides of device substrate 802 in addition to including one or more reference vias. In some embodiments, reference vias 902 and 904 may be non-plated or non-conductive but may include separate conductors that traverse reference vias 902 and 904 to provide the electrical connectivity described above.

Non-reciprocal device 900 of FIG. 9 and each of the components included therein or in association therewith, may include functionality and connectivity beyond what is shown in FIG. 9, as would be apparent to persons skilled in relevant art(s). However, such additional functionality is not shown in FIG. 9 for the sake of brevity.

The next section describes example embedded non-reciprocal device embodiments.

4. Example Embedded Non-Reciprocal Device Embodiments

Non-reciprocal devices may be configured alternative ways (e.g., other than as discrete non-reciprocal devices). As noted above, discrete non-reciprocal devices are non-reciprocal devices which may be coupled with system-level substrates. In the embodiments described in this section, embedded non-reciprocal device configurations are shown, according to exemplary embodiments. Embedded non-reciprocal devices are non-reciprocal devices located within an existing substrate or structure, such as a system substrate of an electronic or communication device. That is, embedded non-reciprocal devices may not be discrete devices according to configurations described herein. A system substrate may be a main circuit board or an auxiliary circuit board of an electronic or communication device. As described in this section, embedded non-reciprocal devices include non-reciprocal devices placed in system substrates during or after the manufacture of the system substrates.

Components of embedded non-reciprocal devices may the same as, or similar to, components of discrete non-reciprocal devices described in the previous section, and for the sake of consistency, non-reciprocal device components of the following embedded non-reciprocal devices are described and shown as the same non-reciprocal device components described in the previous section. For instance, the magnetic sources (e.g., magnet 238), the metal plating (e.g., metal plating 204), the system substrates (e.g., system substrate 234 and cavity 236 therein), the magnetic materials (e.g., magnetic material 302), the ferrites (e.g., ferrite 402), and the insulating layers (e.g., insulating layer 602), described in Section 3 above may also be referenced in this section to describe embedded non-reciprocal device components. It should be noted that in the described embodiments, ferrites (e.g., ferrite 402) may be embedded in a system substrate (e.g., system substrate 234) rather than in device substrates such as device substrate 404 or device substrate 802. In some configurations, one or more ferrites (e.g., one or more of ferrite 402) may be embedded in one or more layers of a system substrate (e.g., system substrate 234).

A. Example Embedded Ferrite Embodiments

Figure 10:
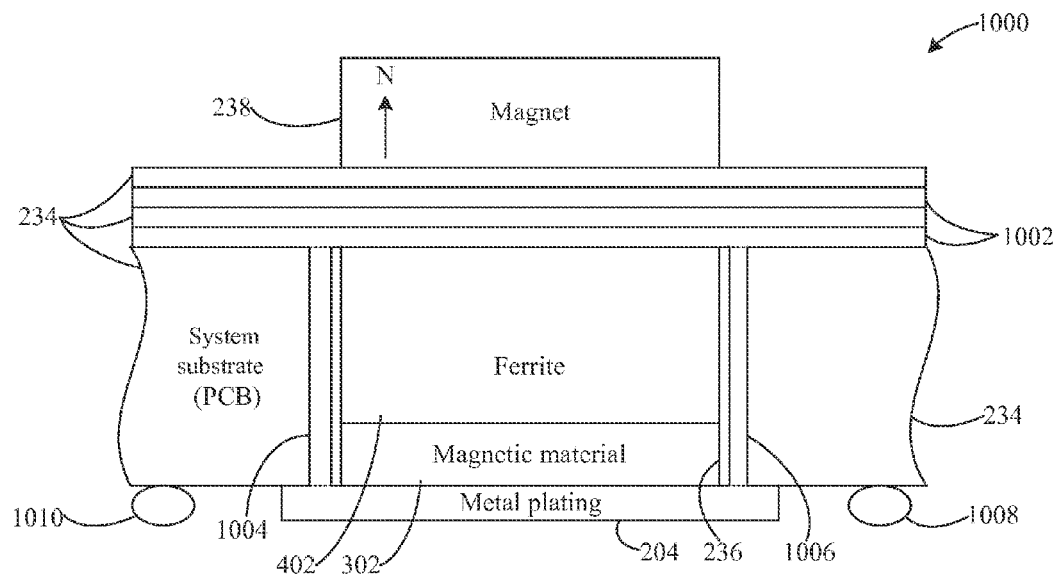
FIG. 10 is a block diagram of a cross-section of a portion of an example implementation of a non-reciprocal device embedded in a system substrate, according to another exemplary embodiment.

Turning now to FIG. 10, an exemplary embedded non-reciprocal device is depicted, according to an embodiment. FIG. 10 shows a cross-sectional side view of a non-reciprocal device 1000. Non-reciprocal device 1000 includes magnet 238, metal plating 204, system substrate 234 and cavity 236 therein, magnetic material 302, ferrite 402, metal layers 1002, a reference via 1004, a reference via 1006, a first substrate connector 1008, and a second substrate connector 1010, as depicted.

As shown, ferrite 402 is embedded in cavity 236 of system substrate 234. In embodiments such as shown in FIG. 10, embedding non-reciprocal device 1000 in a cavity of a system substrate may allow for decreased overall height of embedded non-reciprocal devices.

According to embodiments, system substrate 234 may be composed of multiple sub-layers of system substrate material between or outside of metal layers 1002 as shown in FIG. 10, while it is contemplated that any number of metal layers 1002 and sub-layers of system substrate material be used. Metal layers 1002 may be composed of copper and/or any other electrically conductive material, and in embodiments, the sub-layers of system substrate material and metal layers 1002 may be referred to as system substrate 234.

Non-reciprocal device 1000 and ferrite 402 may include a patterned metallization scheme commensurate with non-reciprocal device 400 of FIG. 4. For example, non-reciprocal device 1000 and ferrite 402 may utilize the configuration of conductors, ports, connectors, ferrite, and/or vias described with respect to non-reciprocal device 400 in a manner substantially similar therewith. The patterned metallization associated with ferrite 402 shown in FIG. 10 may be positioned between ferrite 402 and one of the sub-layers of system substrate 234 shown above ferrite 402, in one of the sub-layers, or on one of the sub-layers.

Magnetic material 302 may also be embedded in system substrate 234 (e.g., in cavity 236). As depicted in FIG. 10, magnetic material 302 may be positioned below ferrite 402 with its bottom surface being substantially planar with the bottom surface of system substrate 234, while in some embodiments, magnetic material 302 may be otherwise position relative to cavity 236, such as outside of cavity 236 and below metal plating 204. Metal plating 204 is shown as being positioned below magnetic material 302 and having a width that is greater than the width of magnetic material 302 and ferrite 402. In embodiments, metal plating 204 may extend outward from reference vias 1004 and 1006 to substantially cover the bottom surface of system substrate 234 or any portion thereof.

Ferrite 402 and magnetic material 302 may be coupled to each other, respectively coupled to system substrate 234, or respectively coupled to other components of non-reciprocal device 1000 using epoxy or in any manner described herein.

In embodiments, reference via 1004 and reference via 1006 extend through both illustrated metal layers 1002 of system substrate 234, however, it is contemplated that in embodiments, reference via 1004 and/or reference via 1006 may extend through one or more metal layers 1002. Reference via 1004 and reference via 1006 may be configured to provide electrical connectivity to metal layers 1002 through which reference via 1004 and reference via 1006 pass or contact and to metal plating 204. Similar to reference vias 902 and 904 of FIG. 9, reference via 1004 and reference via 1006 are configured to provide an electric shielding cage around ferrite 402. Additional reference vias not shown in the depicted cross-section of non-reciprocal device 1000 may be included in system substrate 234 to increase shielding efficacy. In some embodiments, reference vias 1004 and 1006 may be non-plated or non-conductive but may include separate conductors that traverse reference vias 1004 and 1006 to provide the electrical connectivity described above.

Magnet 238 may be positioned above system substrate 234 as shown in FIG. 10. Magnet 238 may have a width and that is approximately the same as ferrite 402 in embodiments. Magnet 238 may be coupled to system substrate 234 using epoxy or in any manner described herein.

First substrate connector 1008, and second substrate connector 1010 may be any connector component such as solder balls (e.g., one solder ball, a plurality of solder balls, a ball grid array (BGA), etc.), pins, surface mount pads, epoxy, and/or the like. First substrate connector 1008 and second substrate connector 1010 may be configured to couple system substrate to another substrate or structure not shown. In some embodiments, first substrate connector 1008, and second substrate connector 1010 may be omitted.

Non-reciprocal device 1000 of FIG. 10 and each of the components included therein or in association therewith, may include functionality and connectivity beyond what is shown in FIG. 10, as would be apparent to persons skilled in relevant art(s). However, such additional functionality is not shown in FIG. 10 for the sake of brevity.

Figure 11:
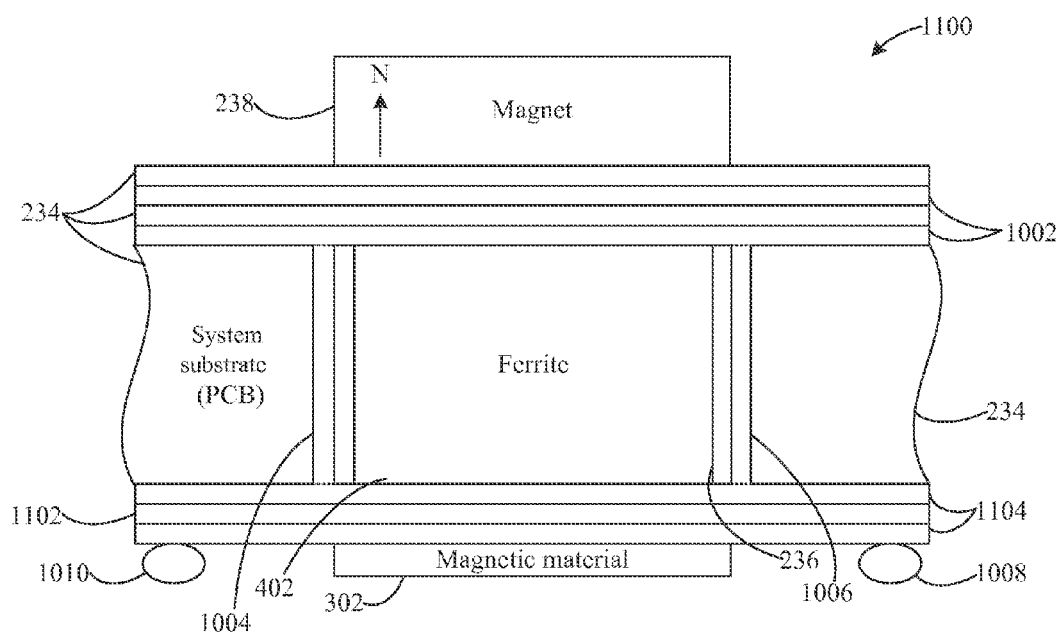
FIG. 11 is a block diagram of a cross-section of a portion of an example implementation of a non-reciprocal device embedded in a system substrate, according to another exemplary embodiment.

In FIG. 11, an exemplary embedded non-reciprocal device is depicted, according to an embodiment. FIG. 11 shows a cross-sectional side view of a non-reciprocal device 1100. Non-reciprocal device 1100 may be a further embodiment of non-reciprocal device 1000 shown in FIG. 10 and described above in this section. For instance, non-reciprocal device 1100 includes various components of non-reciprocal device 1000, as shown in FIG. 11, however, the configuration of non-reciprocal device 1100 may differ from non-reciprocal device 1000 in at least the following described ways.

For example, ferrite 402 in FIG. 11 is shown as entirely embedded within an internal system substrate material layer of system substrate 234, and magnetic material 302 is located on the bottom surface of system substrate 234. Accordingly, system substrate 234 includes an additional substrate material layer 1102 and metal layers 1104 as shown. Furthermore, the non-reciprocal device metallization pattern is located on or in one of the interior system substrate material layers, e.g., on or in the system substrate material immediately above ferrite 402. In this configuration, ferrite 402 may be embedded in the interior of system substrate 234, thus providing improved electrical isolation between magnet 238 and the non-reciprocal device metallization pattern, as well as between ferrite 402 and magnetic material 302, using the system substrate material as isolation layers. Additionally, metal plating 204 may be omitted from embodiments having the configuration shown in FIG. 11.

According to some embodiments, magnet 238 and magnetic material 302 may have width and length dimension greater than ferrite 402 and thus improving the magnetic field used to bias ferrite 402.

Non-reciprocal device 1100 of FIG. 11 and each of the components included therein or in association therewith, may include functionality and connectivity beyond what is shown in FIG. 11, as would be apparent to persons skilled in relevant art(s). However, such additional functionality is not shown in FIG. 11 for the sake of brevity.

B. Example Tuning Circuit Embodiments

Figure 12:
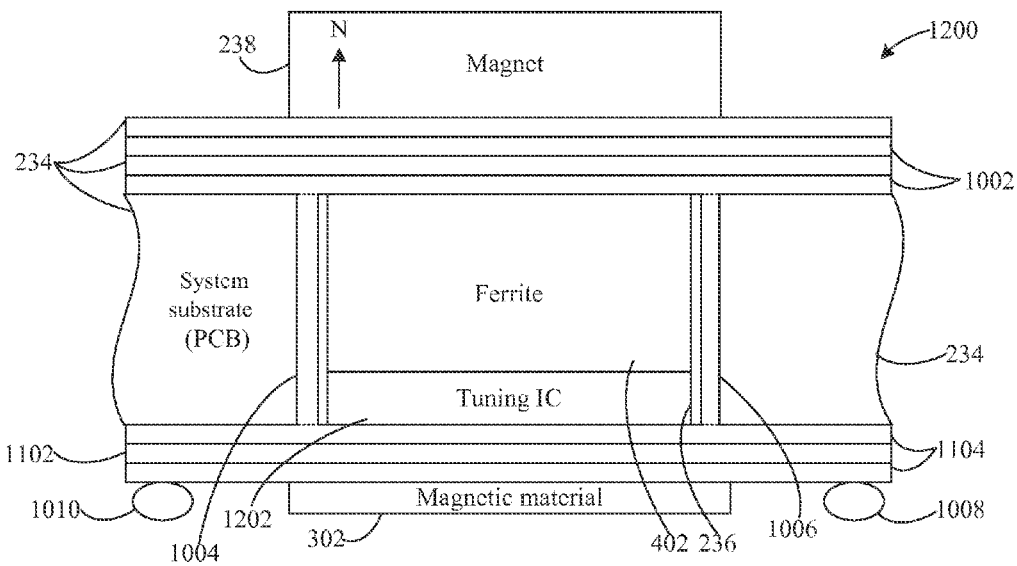
FIG. 12 is a block diagram of a cross-section of a portion of an example implementation of a non-reciprocal device embedded in a system substrate, according to another exemplary embodiment.

In FIG. 12, an exemplary embedded non-reciprocal device is depicted, according to an embodiment. FIG. 12 shows a cross-sectional side view of a non-reciprocal device 1200. Non-reciprocal device 1200 may be a further embodiment of non-reciprocal device 1100 shown in FIG. 11 and described above in this section. For instance, non-reciprocal device 1200 includes various components of non-reciprocal device 1100, as shown in FIG. 12, however, the configuration of non-reciprocal device 1200 may differ from non-reciprocal device 1100 in at least the following described ways.

For instance, non-reciprocal device 1200 includes a tuning integrated circuit ("IC") 1202. Tuning IC 1202 may be located in the interior of system substrate 234. In embodiments, tuning IC 1202 may be positioned below ferrite 402 in an interior system substrate material layer. For instance, tuning IC 1202 may be within the same layer as ferrite 402. Tuning IC 1202 may be coupled to ferrite 402 and/or to system substrate 234 using any coupling technique described herein, e.g., using epoxy.

Tuning IC 1202 may include a silicon-based circuit. Tuning IC 1202 may be configured to tune and/or facilitate impedance matching between non-reciprocal device 1200 and other circuits in a device (e.g., a communication device) with which non-reciprocal device 1200 is operably, magnetically, and/or communicatively coupled by tuning parameters associated with non-reciprocal device 1200. For example, tuning IC 1202 may include a temperature sensor used to tune non-reciprocal device 1200 according to temperature various experienced during operation which may cause deviations in circuit impedances or in performance of ferrite 402.

Non-reciprocal device 1200 of FIG. 12 and each of the components included therein or in association therewith, may include functionality and connectivity beyond what is shown in FIG. 12, as would be apparent to persons skilled in relevant art(s). However, such additional functionality is not shown in FIG. 12 for the sake of brevity.

Figure 13:
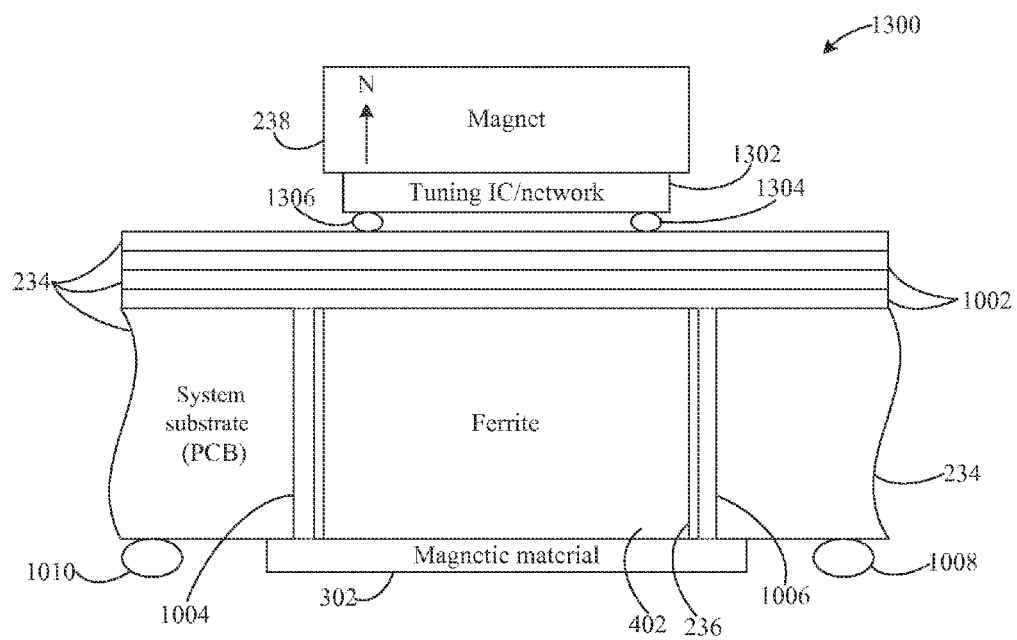
FIG. 13 is a block diagram of a cross-section of a portion of an example implementation of a non-reciprocal device embedded in a system substrate, according to another exemplary embodiment.

Turning now to FIG. 13, an exemplary embedded non-reciprocal device is depicted, according to an embodiment. FIG. 13 shows a cross-sectional side view of a non-reciprocal device 1300. Non-reciprocal device 1300 may be a further embodiment of non-reciprocal device 1200 shown in FIG. 12 and described above in this section. For instance, non-reciprocal device 1300 includes various components of non-reciprocal device 1200, as shown in FIG. 13, however, the configuration of non-reciprocal device 1300 may differ from non-reciprocal device 1200 in at least the following described ways.

For instance, in non-reciprocal device 1300, system substrate material layer 1102 and metal layers 1104 may be omitted. Magnetic material 302, first substrate connector 1008, and second substrate connector 1010 may be positioned on the bottom surface of system substrate 234, as depicted in FIG. 13.

Non-reciprocal device 1300 includes tuning IC 1202, as described above with respect to FIG. 12. According to the embodiment illustrated in FIG. 13, tuning IC 1202 may be configured as a wafer level chip scale package ("WLCSP") with a first tuner connector 1304 and a second tuner connector 1306. In embodiments, first tuner connector 1304 and second tuner connector 1306 may be any type of connector described or contemplated herein. Tuning IC 1302 may be located in the top surface of system substrate 234 and below magnet 238, as in FIG. 13. In embodiments, the positioning of tuning IC 1202 may reduce or minimize circuit parasitics due to the proximity of tuning IC 1020 to the metallization pattern located in the top system substrate material layers of system substrate 234.

Magnet 238 may be coupled to tuning IC 1202 using any coupling technique described herein, e.g., using epoxy.

Non-reciprocal device 1300 of FIG. 13 and each of the components included therein or in association therewith, may include functionality and connectivity beyond what is shown in FIG. 13, as would be apparent to persons skilled in relevant art(s). However, such additional functionality is not shown in FIG. 13 for the sake of brevity.

C. Example Shield Can Embodiments

As described above in various embodiments, combinations of electrical conductors (e.g., metal plating 204, plated vias, etc.) may be electrically coupled to form shielding cages. In embodiments, shield cages may be replaced by magnetic shield cans as described below.

FIG. 14A depicts a bottom view of a magnetic shield can. As shown, magnetic shield can ("can") 1400A includes a can cavity 1402, a can shell 1404, and a plurality of can pins 1406. Can 1400A may be comprised of magnetic materials such as steel, iron, a permalloy, magnets, and/or the like. The dimensional aspects of can cavity 1402 and can shell 1404 may vary in different configurations based upon design and performance goals and/or constraints. In embodiments, can pins 1406 are configured to be inserted into holes or vias in a substrate (e.g., system substrate 234) to facilitate coupling. When coupled to a substrate, the bottom can shell edge 1408 may be in contact with, or closely positioned to, a surface of the coupled substrate. Additionally, can pins 1406 may be configured to traverse the height of the coupled substrate and come into contact with a magnetic material (e.g., magnetic material 302) on a substrate surface opposite can 1400A when coupled to the substrate. In this configuration, can 1400A provides a magnetic shield and a magnetic circuit (where can pins 1406 act as return paths to a magnetic material on a substrate for magnetic fields, described in further detail below) around a non-reciprocal device ferrite (e.g., ferrite 402) and/or a non-reciprocal device in one or more embodiments described herein. A magnet (e.g., magnet 238 as shown) may be coupled within can cavity 1402 of can 1400A using epoxy or other coupling techniques.

FIG. 14B depicts a cross-sectional side view of the magnetic shield can shown in FIG. 14A. As shown, can 1400B includes can cavity 1402 (shown as cross-hatched regions), can shell 1404, and can pins 1406. Magnet 238 and bottom can shell edge 1408 are also included. The dimensions and number of can pins 1406 may vary according to various substrate, ferrite, and/or non-reciprocal device embodiments and parameters. For instance, fewer or more can pins 1406 may be included, and their respective extrusions may be increased or decreased based upon substrate thickness. In some configurations, can pins 1406 may only extend partially through holes or vias in the substrate and may be coupled to magnetic material filing these holes or vias which may in turn be coupled a magnetic material on the opposite side of the substrate from the can 1400B.

Can 1400A of FIG. 14A and can 1400B of FIG. 14B may thus provide an enclosure that shields a non-reciprocal device from stray magnetic fields and other signals which may interfere with non-reciprocal device operation. Such shielding may also be beneficial in electronic devices and communication devices that implement near field communications ("NFC") and/or wireless charging.

Can 1400A of FIG. 14A and can 1400B of FIG. 14B, and each of the respective components included therein or in association therewith, may include functionality and connectivity beyond what is shown in FIGS. 14A and 14B, as would be apparent to persons skilled in relevant art(s). However, such additional functionality is not shown in FIGS. 14A and 14B for the sake of brevity.

In FIG. 15, an exemplary embedded non-reciprocal device with magnetic shielding can is depicted, according to an embodiment. FIG. 15 shows a cross-sectional side view of a non-reciprocal device 1500. Non-reciprocal device 1500 may be a further embodiment of non-reciprocal device 1100 shown in FIG. 11 and described above in this section. For instance, non-reciprocal device 1500 includes various components of non-reciprocal device 1100, as shown in FIG. 15, however, the configuration of non-reciprocal device 1500 may differ from non-reciprocal device 1100 in at least the following described ways.

For example, as shown in FIG. 15, a can 1502 is included. Can 1502 may be a further embodiment of can 1400A of FIG. 14A and/or can 1400B of FIG. 14B described above. In addition to providing magnetic shield as described above, can 1502 may also be configured to as a magnetic field circuit. For instance, a magnetic field produced by magnet 238 (and used to bias ferrite 402) may extend upward and outward according to the indication of magnetic polarization shown for magnet 238 and into can shell 1404. As noted herein, can 1502 may be composed of a magnetic material, and thus the magnetic field may be directed down can pins 1406 to magnetic material 302. From magnetic material 302, the magnetic field may be directed upward again, through ferrite 402 and back to magnet 238. Accordingly, based on this configuration, the magnetic field circuit may be completed.

In embodiments, an additional magnetic material may be included in non-reciprocal device 1500 and be included in cavity 236 below ferrite 402. The additional magnetic material may facilitate the path taken by a magnetic field through the magnetic field circuit. In some embodiments, non-reciprocal device 1500 may be also be a further embodiment of non-reciprocal device 1200 of FIG. 12 and/or of non-reciprocal device 1300 of FIG. 13. In these embodiments, tuning IC 1202 and/or tuning IC 1302 may be included in non-reciprocal device 1500 in addition to can 1502. For instance, components related to the tuning, impedance matching, and/or operation of a non-reciprocal device (e.g., non-reciprocal device 1500) as described herein, may be embedded in system substrate 234, as shown in FIG. 15, or in a device substrate as described in the embodiments herein (e.g., device substrate 802), which may be attached to a system substrate, for example.

Non-reciprocal device 1500 of FIG. 15 and each of the components included therein or in association therewith, may include functionality and connectivity beyond what is shown in FIG. 15, as would be apparent to persons skilled in relevant art(s). However, such additional functionality is not shown in FIG. 15 for the sake of brevity.

D. Example Active Tuning Coil Embodiments

Embedded non-reciprocal device configurations may include active magnetic field tuning, according to exemplary embodiments. Active magnetic field tuning may be performed using an active coil or solenoid added around a ferrite in a non-reciprocal device. The active coil may tune the non-reciprocal device by adjusting an applied, biasing magnetic field. An active coil may comprise a conductive material through which a current may be applied to induce an electromagnet field from the active coil. Current applied in a first direction may increase or augment an applied, biasing magnetic field, while current applied in a second, opposite direction may decrease or counteract an applied, biasing magnetic field.

Figure 16:
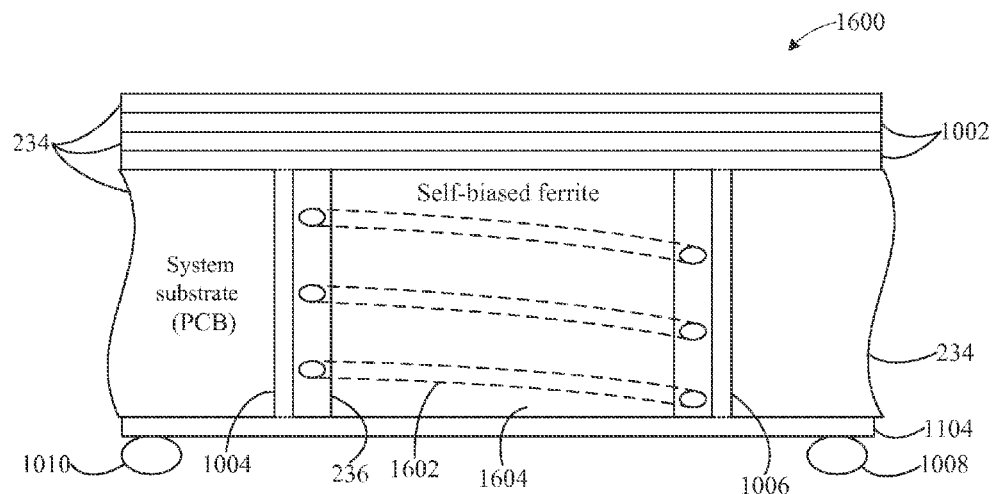
FIG. 16 is a block diagram of a cross-section of a portion of an example implementation of a non-reciprocal device embedded in a system substrate with an active tuning coil, according to an exemplary embodiment.

FIG. 16 depicts an exemplary embedded non-reciprocal device with an active tuning coil, according to an embodiment. FIG. 16 shows a cross-sectional side view of a non-reciprocal device 1600. Non-reciprocal device 1600 may be a further embodiment of non-reciprocal device 1000 shown in FIG. 10 and/or non-reciprocal device 1100 shown in FIG. 11, described above in this section. For instance, non-reciprocal device 1600 includes various components of non-reciprocal devices 1000 and 1100, as shown in FIG. 16, however, some components are not shown for illustrative clarity. The configuration of non-reciprocal device 1600 may differ from non-reciprocal devices 1000 and/or 1100 in at least the following described ways.

For example, as shown, FIG. 16 includes an active coil ("coil") 1602. Coil 1602 is shown as being wrapped around a self-biased ferrite 1604. In embodiments, coil 1602 may be printed or embedded in system substrate 234, while in other embodiments, coil 1602 may be wrapped around the surface of self-biased ferrite 1604. The winding of coil 1602 is positioned between self-biased ferrite 1604 and reference vias 1004 and 1006. The number of turns shown in FIG. 16 is exemplary, and any number of turns may be used according to tuning requirements. Additionally, coil 1602 may be wrapped around all or a portion of self-biased ferrite 1604.

The inclusion of self-biased ferrite 1604 may eliminate the requirement of a magnet (e.g., magnet 238 as described herein) or other magnetic field source as self-biased ferrite 1604 is itself a magnetic field source. However, in embodiments it is contemplated that a magnet may be used in conjunction with a self-biased ferrite (e.g., self-biased ferrite 1602) to supplement the generated magnetic field.

Figure 17:
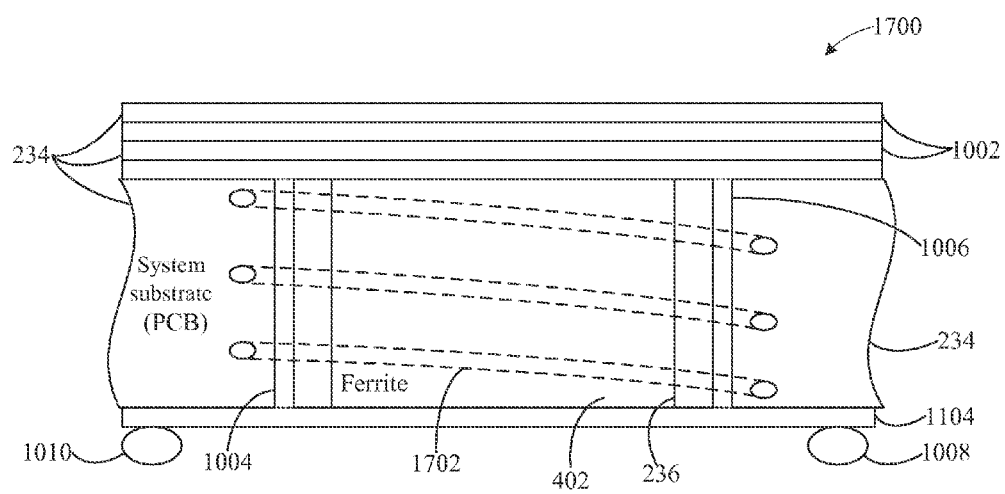
FIG. 17 is a block diagram of a cross-section of a portion of an example implementation of a non-reciprocal device embedded in a system substrate with an active tuning coil, according to another exemplary embodiment.

FIG. 17 depicts an exemplary embedded non-reciprocal device with an active tuning coil, according to an embodiment. FIG. 17 shows a cross-sectional side view of a non-reciprocal device 1700. Non-reciprocal device 1700 may be a further embodiment of non-reciprocal device 1600 shown in FIG. 16, described above in this subsection. For instance, non-reciprocal device 1700 includes various components of non-reciprocal device 1600, as shown in FIG. 17, however, some components are not shown for illustrative clarity. The configuration of non-reciprocal device 1700 may differ from non-reciprocal device 1600 in at least the following described ways.

For example, as shown, FIG. 17 includes an active coil ("coil") 1702. Coil 1702 is shown as being wrapped around ferrite 402. In embodiments, coil 1702 may be printed or embedded in system substrate 234, while in other embodiments, coil 1702 may be wrapped around the surface of ferrite 1704. The winding of coil 1702 is positioned outside of reference vias 1004 and 1006. The number of turns shown in FIG. 17 is exemplary, and any number of turns may be used according to tuning requirements. Additionally, coil 1702 may be wrapped around all or a portion of ferrite 402.

It is contemplated that the active magnetic tuning described in FIGS. 16 and 17 may be implemented in other non-reciprocal device embodiments described in this section and in conjunction with other features described therein. Furthermore, while a self-biased ferrite (e.g., 1602) is shown in FIG. 16 and a non-self-biased ferrite (e.g., 402) is shown in FIG. 17, each ferrite may be self-biased or not self-biased in embodiments.

Non-reciprocal device 1600 of FIG. 16 and non-reciprocal device 1700 of FIG. 17, and each of the respective components included therein or in association therewith, may include functionality and connectivity beyond what is shown in FIG. 16 and FIG. 17, as would be apparent to persons skilled in relevant art(s). However, such additional functionality is not shown in FIG. 16 and FIG. 17 for the sake of brevity.

Example communication circuit embodiments are described in the next section.

5. Example Communication Circuit Embodiments

The non-reciprocal device embodiments described above may be implemented in electronic devices and/or communication devices. For example, FIG. 18 shows a block diagram of an example non-reciprocal device configuration in a communication circuit, according to embodiments.

Figure 18:
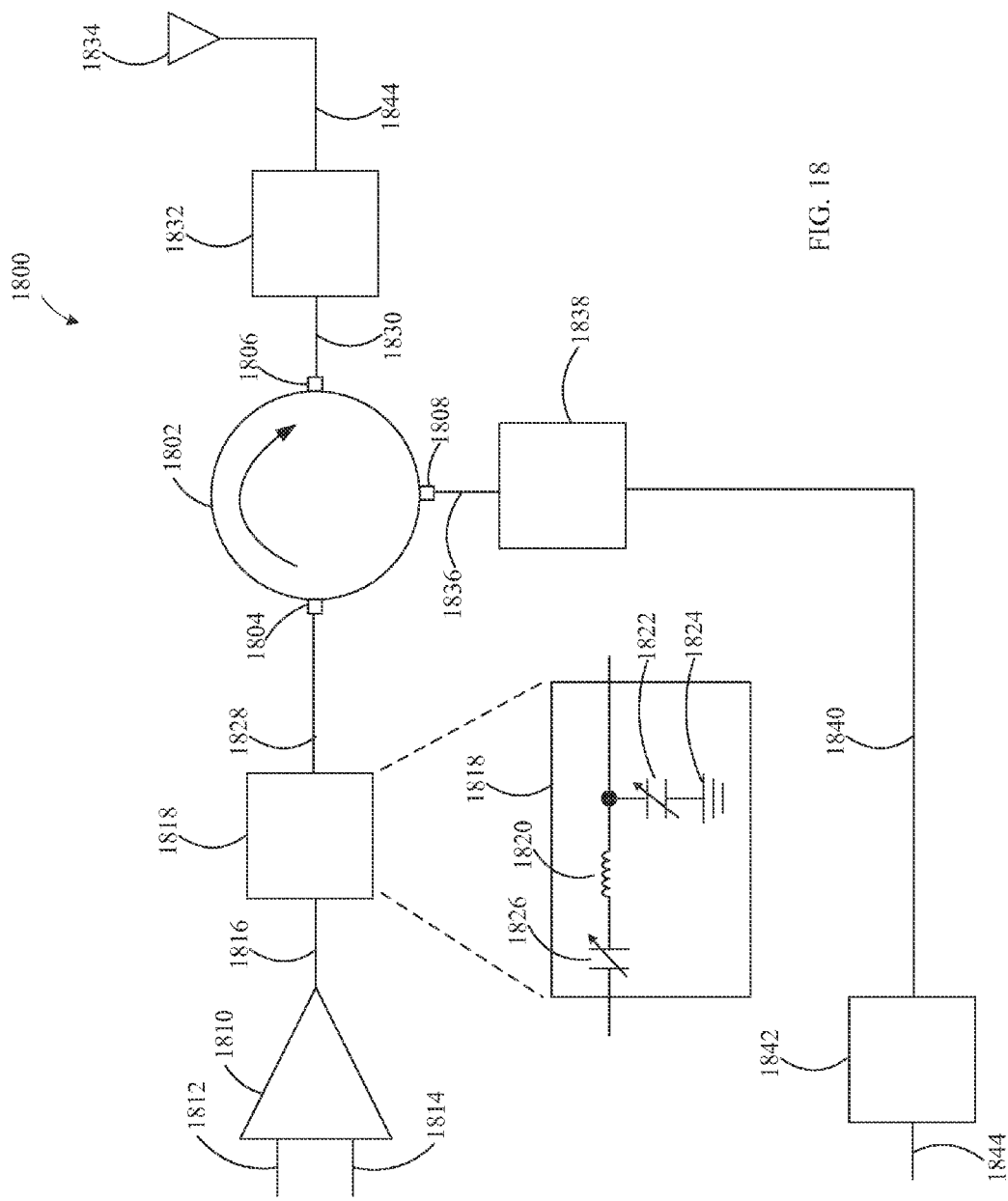
FIG. 18 is a block diagram of a tuned non-reciprocal device circuit, according to an exemplary embodiment.

FIG. 18 shows an exemplary communication circuit 1800. In embodiments, communication circuit may comprise a portion of a communication device (not shown). Communication circuit 1800 includes a non-reciprocal device 1802, a power amplifier 1810, a first tuning block 1818, a second tuning block 1832, a third tuning block 1838, an antenna 1834, and a receiver block 1842. Non-reciprocal device 1802 includes a first port 1804, a second port 1806, and a third port 1808. Non-reciprocal device 1802 may be configured according to any non-reciprocal device embodiments described herein. Power amplifier 1810 includes a first amplifier input 1812, a second amplifier input 1814, and an amplifier output 1816. In embodiments, first tuning block 1818, second tuning block 1832, and third tuning block 1838 may be similarly configured as shown in the expanded view of first tuning block 1818. For example, first tuning block 1818 may include a input capacitor 1822, a reference voltage connector 1824, an inductor 1820 and an output capacitor 1826. Antenna 1834 may comprise one or more antennas (although only a single antenna is shown for illustrative clarity) configured to transmit and/or receive communication signals. Receiver block 1842 includes a receiver input 1840 and a receiver output 1844.

Power amplifier 1810 is coupled to the input of first tuning block 1818 by power amplifier output 1816. First port 1804 of non-reciprocal device 1802 is coupled to the output of first tuning block 1818 by signal line 1828. Second port 1806 of non-reciprocal device 1802 is coupled to second tuning block 1818 by bidirectional signal line 1830. Second tuning block 1832 is coupled to antenna 1834 by bidirectional signal line 1844. Third port 1808 of non-reciprocal device 1802 is coupled to the input of third tuning block 1838 by signal line 1836. The output of third tuning block 1838 is coupled to receiver block 1842 by receiver input 1840.

Power amplifier 1810 may receive input signals on first amplifier input 1812 and second amplifier input 1814 from other circuits or components (not shown) in communication device 1800, and may transmit an output signal(s) on amplifier output 1816. Power amplifier 1810 may be a differential power amplifier, according to embodiments. In differential power amplifier embodiments, it should be noted that amplifier output 1816, first tuning block 1818, signal line 1828, and non-reciprocal device 1802 (e.g., first port 1804) may be configured to transmit and/or receive differential signals. In other embodiments, power amplifier 1810 may be any other kind of power amplifier.

As describe above, first tuning block 1818 includes input capacitor 1826, reference voltage connector 1824, inductor 1820, and output capacitor 1822. Input capacitor 1826 may be connected between the input of first tuning block 1818 and inductor 1820. Inductor 1820 may be connected between input capacitor 1826, and the output of first tuning block 1818 and output capacitor 1826. Output capacitor may be connected between reference voltage connector 1824 and the output of first tuning block 1818. It is contemplated that other tuning circuits may be implemented in one or more of first tuning block 1818, second tuning block 1832, and/or third tuning block 1838, as would be apparent to one of skill in the relevant art(s) having the benefit of this disclosure.

First tuning block 1818 may be configured to tune statically or to tune dynamically. For example, as shown, input capacitor 1826 and output capacitor 1822 may be fixed or may be dynamically adjustable. By dynamically adjusting one or more of input capacitor 1826 and output capacitor 1822, non-reciprocal device 1802 may be impedance matched with power amplifier 1810. The ability to dynamically configure first tuning block 1818 allows communication circuit 1800 to adapt to changes in circuit temperature, circuit voltages, and/or circuit currents, each of which may alter the effective impedance of one or more portions of communication circuit 1800. In embodiments, first tuning block 1818 may perform dynamic adjustments for envelop tracking for power amplifier 1810.

Second tuning block 1832 and third tuning block 1838 may be configured similarly to first tuning block 1818. For example, second tuning block 1832 may perform impedance matching (e.g., dynamic impedance matching) between non-reciprocal device 1802 and antenna 1834.

It is contemplated that in embodiments, one or more of first tuning block 1818, second tuning block 1832, and third tuning block 1838 may be incorporated into non-reciprocal device 1802. For instance, where non-reciprocal device 1802 corresponds to discrete non-reciprocal device embodiments shown in FIGS. 2A-2C, FIG. 3, and FIGS. 6-7, one or more of the described tuning blocks may be coupled to or included in non-reciprocal device 1802 by coupling above or below non-reciprocal device 1802, or may be coupled on or in a device substrate of non-reciprocal device 1802. Where non-reciprocal device 1802 corresponds to embedded non-reciprocal device embodiments shown in FIGS. 10-13 and FIGS. 15-17, one or more of the described tuning blocks may be coupled to or included in non-reciprocal device 1802 by coupling above or below non-reciprocal device 1802, or may be coupled on or in a system substrate of non-reciprocal device 1802.

Receiver block 1842 may receive an input signal(s) on receiver input 1840. Receiver block 1842 may transmit output signals on receiver output 1844 to other circuits or components (not shown) in communication device 1800. Receiver block 1842 may be a differential receiver, according to embodiments. In other embodiments, receiver block 1842 may be any other kind of receiver.

It is contemplated that filtering (not shown for illustrative clarity) may be performed between non-reciprocal device 1802 and receiver 1842 (e.g., to reduce (e.g., eliminate) an interfering effect of jammers) and/or between power amplifier 1810 and non-reciprocal device 1802 (e.g., to reduce (e.g., eliminate) transmitted noise that falls in other receive bands).

Additionally, while not shown, non-reciprocal device 1802 may include a connection to a reference voltage (e.g., similar to reference voltage connector 1824), and such a connection may include a capacitor (e.g., similar to output capacitor 1822) and/or a tuning circuit (e.g., similar to first tuning circuit 1818).

In embodiments, one or more communication circuits 1800 may be present in a communication device (not shown) such as a cellular phone or a smart phone. For example, a first communication circuit 1800A and a second communication circuit 1800B may be included. In embodiments, the respective communication circuits may each be configured to operate according to one or more communication frequencies or frequency bands. For example, first communication circuit 1800A may be configured to operate according to a low frequency band (e.g., 700-900 MHz) and second communication circuit 1800B may be configured to operate according to a high frequency band (e.g., 1.7-2.6 GHz). The coupling of first communication circuit 1800A and second communication circuit 1800B to an antenna may be accomplished by coupling through a switch. In this described communication device embodiment, first communication circuit 1800A and second communication circuit 1800B may operate similarly or substantially similarly to communication circuit 1800 described above.

Communication circuit 1800 of FIG. 18, and each of the components included therein or in association therewith, may include functionality and connectivity beyond what is shown in FIG. 18, as would be apparent to persons skilled in relevant art(s). However, such additional functionality is not shown in FIG. 18 for the sake of brevity.

The next section describes example manufacturing embodiments.

6. Example Manufacturing Embodiments

In this section, the exemplary processes for manufacturing the embodiments set forth herein are described. Non-reciprocal devices and their components, as well as circuitry and devices associated therewith, may be manufactured according to the following flowcharts.

Figure 19:
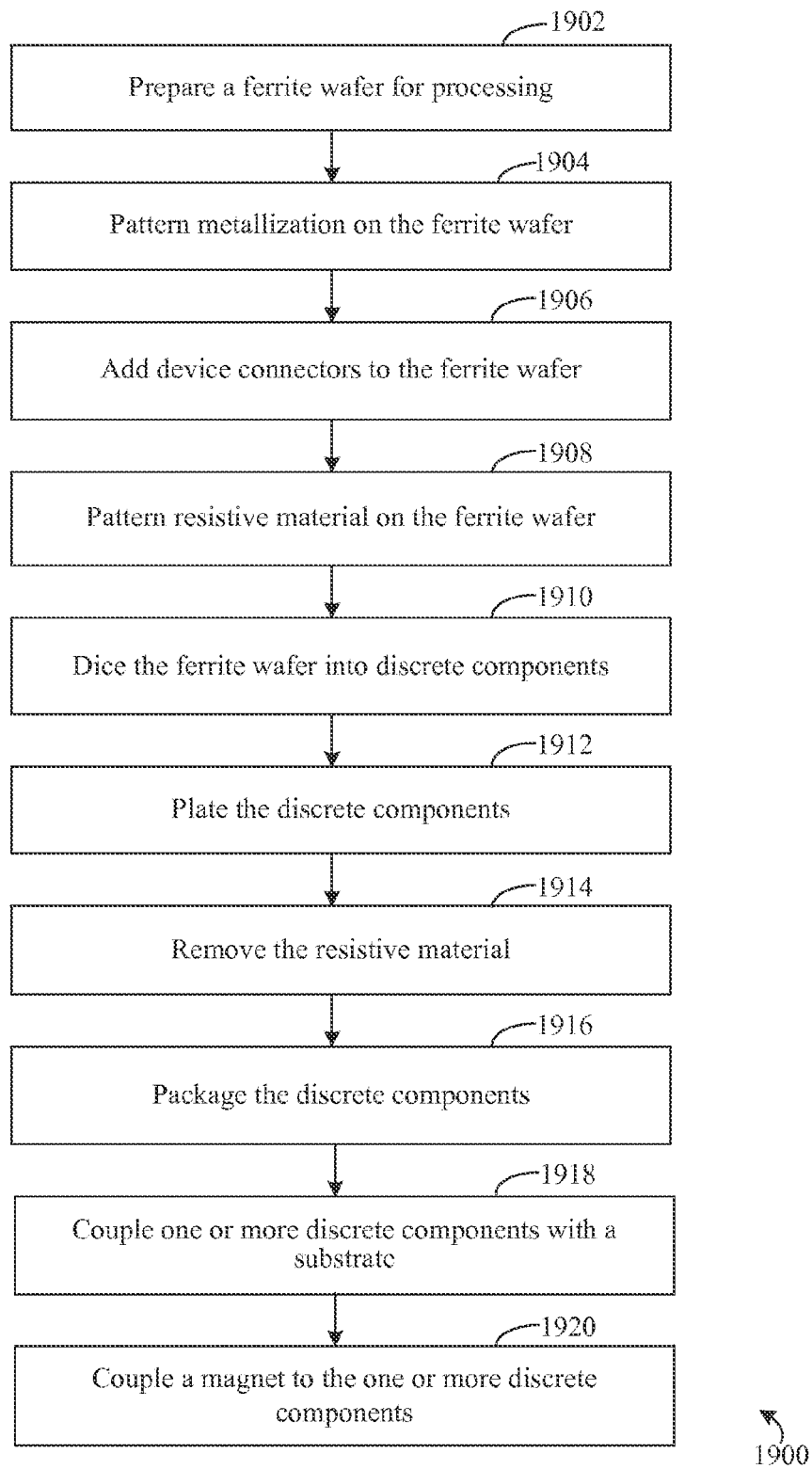
FIG. 19 is a flowchart of an example method for manufacturing discrete non-reciprocal devices, according to an exemplary embodiment.

For example, FIG. 19 shows a flowchart 1900 providing example steps for manufacturing discrete non-reciprocal devices, according to an exemplary embodiment. Other structural and operational embodiments will be apparent to persons skilled in the relevant art(s) based on the discussion regarding flowchart 1900. Flowchart 1900 is described as follows.

Flowchart 1900 may begin with step 1902. In step 1902, a ferrite wafer may be prepared for processing. Preparation may include, but is not limited to, growing or fabricating the ferrite wafer, cleaning the ferrite wafer, and/or the like.

In step 1904, metallization may be patterned on the ferrite wafer. In embodiments, the patterned metallization may be one or more of the patterned metallization embodiments described herein, such as in FIG. 2B.

In step 1906, device connectors may be added to the ferrite wafer. Device connectors may be connectors such as those described herein (e.g., solder balls (one solder ball, a plurality of solder balls, a ball grid array (BGA), etc.), pins, surface mount pads, epoxy, and/or the like).

In step 1908, resistive material may be patterned on the ferrite wafer. In embodiments, resistive materials may be patterned to prevent portions of the surface of the ferrite wafer from being plated with an electrical conductor.

In step 1910, the ferrite wafer may be diced into discrete components. The ferrite wafer may be cut or diced according to any known techniques for cutting ferrite materials.

In step 1912, the discrete components may be plated. For example, an electrical conductor may be applied to one or more portions of the surface of the ferrite wafer that do not have the resistive material applied. Reference voltage conductors, ground planes, metal plating, and/or the like may be formed accordingly.

In step 1914, the resistive material may be removed. The resistive material may be removed by processes such as chemical etching, polishing, and/or the like.

In step 1916, the discrete components may be packaged. As described in the embodiments herein, discrete non-reciprocal devices (e.g., "lumped element" devices) may be packaged to facilitate coupling of the devices to system substrates or other structures in packages such as WLCSP, wafer level ball grid array ("WLBGA"), etc.

In step 1918, one or more discrete components may be coupled with a substrate.

For instance, discrete components may be coupled to a substrate by device connectors and the techniques described in Section 3 above.

In step 1920, a magnet may be coupled to the one or more discrete components. Magnets may be coupled to discrete components using any of the techniques described in Section 3 above, e.g., by using epoxy.

It is contemplated that in some embodiments, magnets may be coupled to the one or more discrete components while in an un-magnetized, or weakly magnetized, state. In such embodiments, the magnet may be more strongly magnetized (e.g., tuning the magnet to a desired magnetic strength) using a magnetic pulse from a solenoid and/or the like. For instance, the strength of one or more magnets added to a non-reciprocal device (e.g., such as those described herein) may be measured. Based upon the measurement(s) of magnetic strength, varying levels of magnetic pulse may be applied to the one or more magnets to achieve the desired strength(s). It should be noted that the tuning of magnets added to non-reciprocal devices is applicable to any or all of the embodiments described herein.

In some example embodiments, one or more steps 1902, 1904, 1906, 1908, 1910, 1912, 1914, 1916, 1918, and/or 1920 of flowchart 2000 may not be performed. Moreover, steps in addition to or in lieu of steps 1902, 1904, 1906, 1908, 1910, 1912, 1914, 1916, 1918, and/or 1920 may be performed. Further, in some example embodiments, one or more of steps 1902, 1904, 1906, 1908, 1910, 1912, 1914, 1916, 1918, and/or 1920 may be performed out of order, in an alternate sequence, or partially (or completely) concurrently with other steps.

Figure 20:
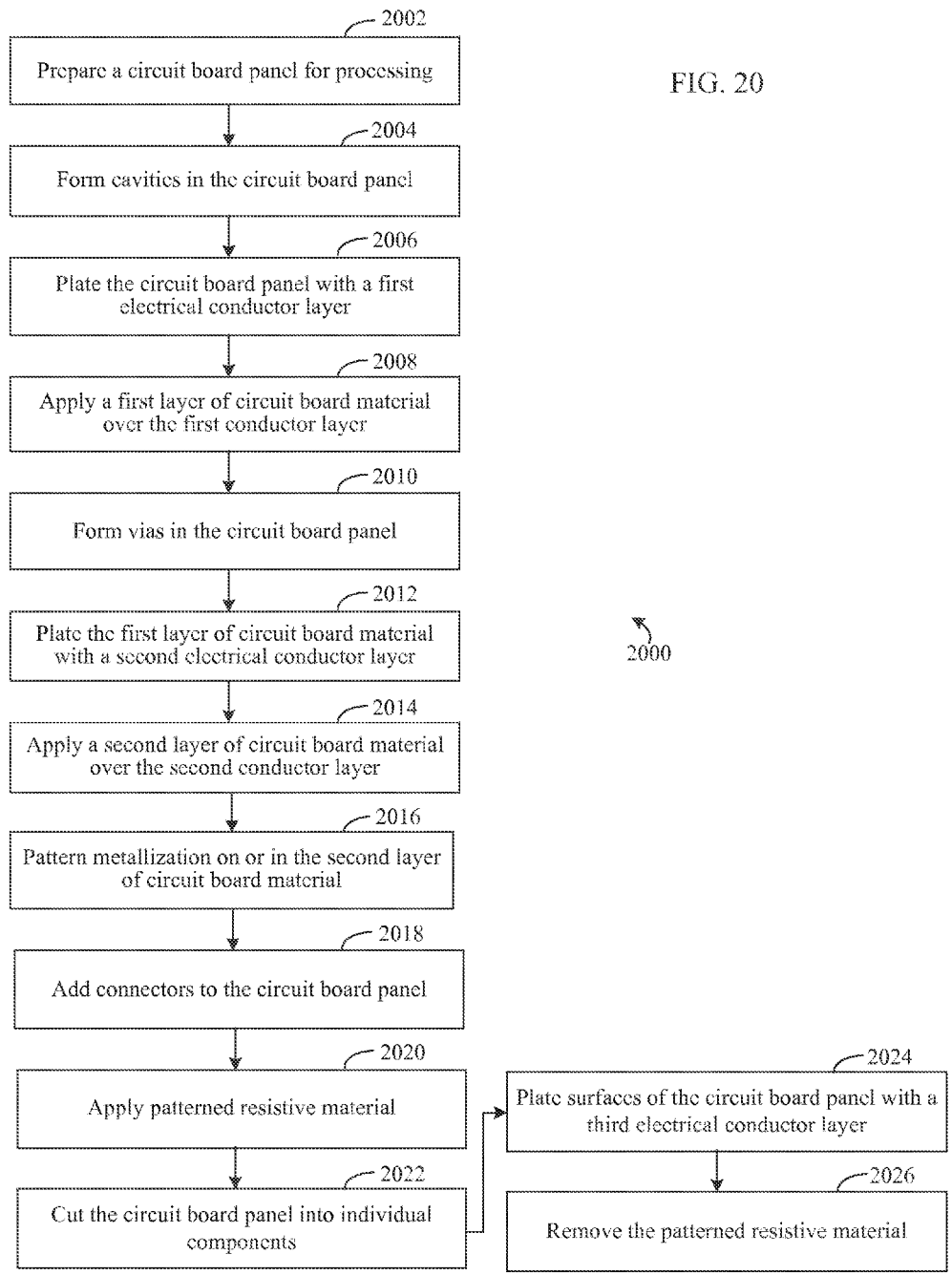
FIG. 20 is a flowchart of an example method for manufacturing embedded non-reciprocal devices, according to an exemplary embodiment.

FIG. 20 shows a flowchart 2000 providing example steps for manufacturing embedded non-reciprocal devices, according to an exemplary embodiment. Other structural and operational embodiments will be apparent to persons skilled in the relevant art(s) based on the discussion regarding flowchart 2000. In some embodiments, the steps of flowchart 2000 may correspond to the features shown in FIG. 5. Flowchart 2000 is described as follows.

Flowchart 2000 may begin with step 2002. In step 2002, a circuit board panel may be prepared for processing. Preparation may include, but is not limited to, growing, forming, or fabricating forming a base layer of circuit board material such as FR4 or the like, cleaning the base layer, etc.

In step 2004, cavities may be formed in the circuit board panel. Cavities may be cut by conventional techniques or may be laser cut, perforated and punched, drilled, and/or the like. Cavity size and shape may be selected to correspond to the size of a ferrite (and/or other component) to be placed in the cavity.

In step 2006, the circuit board panel may be plated with a first electrical conductor layer. For example, an electrical conductor may be applied to one or more portions of the surface of the circuit board panel. In embodiments, standard plating techniques such as electroplating may be used. Reference voltage conductors, ground planes, metal plating, and/or the like may be formed accordingly.

In step 2008, a first layer of circuit board material may be applied over the first conductor layer. In embodiments, the first layer may be formed in a similar fashion as the base layer described above.

In step 2010, vias may be formed in the circuit board panel. Vias may be punched, drilled, laser cut, or the like, and vias may be plated with conductive material in accordance with embodiments.

In step 2012, the first layer of circuit board material may be plated with a second electrical conductor layer. The second layer may be formed similar to the first layer described above, in embodiments.

In step 2014, a second layer of circuit board material may be applied over the second conductor layer. The second layer may be formed similar to the first layer described above, in embodiments.

In step 2016, metallization may be patterned on or in the second layer of circuit board material. In embodiments, the patterned metallization may be one or more of the patterned metallization embodiments described herein, such as in FIG. 4.

In step 2018, connectors may be added to the circuit board panel. Connectors may be connectors such as those described herein (e.g., solder balls (one solder ball, a plurality of solder balls, a ball grid array (BGA), etc.), pins, surface mount pads, epoxy, and/or the like).

In step 2020, patterned resistive material may be applied to the circuit board panel. In embodiments, resistive materials may be patterned to prevent portions of the surface of the ferrite wafer from being plated with an electrical conductor.

In step 2022, the circuit board panel may be cut into individual components. The circuit board panel may be cut according to any known techniques for cutting circuit board panels.

In step 2024, surfaces of circuit board panel may be plated with a third electrical conductor layer. For example, an electrical conductor may be applied to one or more portions of the surface of the circuit board panel that do not have the resistive material applied. Reference voltage conductors, ground planes, metal plating, and/or the like may be formed accordingly.

In step 2026, the patterned resistive material may be removed. The resistive material may be removed by processes such as chemical etching, polishing, and/or the like.

In some example embodiments, one or more steps 2002, 2004, 2006, 2008, 2010, 2012, 2014, 2016, 2018, 2020, 2022, 2024, and/or 2026 of flowchart 2000 may not be performed. Moreover, steps in addition to or in lieu of steps 2002, 2004, 2006, 2008, 2010, 2012, 2014, 2016, 2018, 2020, 2022, 2024, and/or 2026 may be performed. Further, in some example embodiments, one or more of steps 2002, 2004, 2006, 2008, 2010, 2012, 2014, 2016, 2018, 2020, 2022, 2024, and/or 2026 may be performed out of order, in an alternate sequence, or partially (or completely) concurrently with other steps.

Figure 21:
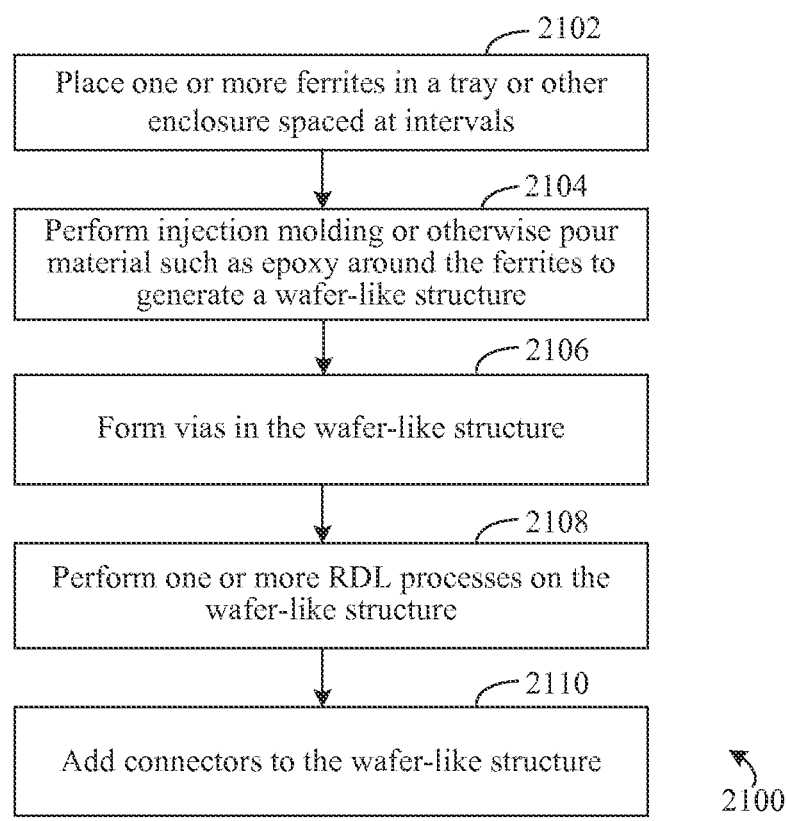
FIG. 21 is a flowchart of an example method for manufacturing non-reciprocal devices, according to an exemplary embodiment.

FIG. 21 shows a flowchart 2100 providing example steps for manufacturing embedded non-reciprocal devices, according to an exemplary embodiment. Other structural and operational embodiments will be apparent to persons skilled in the relevant art(s) based on the discussion regarding flowchart 2100. In some embodiments, the steps of flowchart 2100 may correspond to the features shown in FIG. 5. Flowchart 2100 is described as follows.

Flowchart 2100 may begin with step 2102. In step 2102, one or more ferrites may be placed in a tray or other enclosure spaced at intervals. The interval spacing may be based upon design considerations and/or the like.

In step 2104, injection molding may be performed (or material such as epoxy is otherwise poured around the ferrites) to generate a wafer-like structure. Known injection molding techniques and materials may be used to form the ferrite-containing wafer-like structure.

In step 2106, vias may be formed in the wafer-like structure. Vias may be punched, drilled, laser cut, or the like, and vias may be plated with conductive material in accordance with embodiments. Vias may be configured to provide electrical connections between the top and bottom sides of the wafer-like structure.

In step 2108, one or more RDL processes may be performed on the wafer-like structure. For example, one or more sides of the wafer-like structure may have an RDL process performed thereon. In embodiments, the vias formed in step 2106 may be plated during step 2108. The one or more RDL processes may include the formation of one or more layers.

In step 2110, connectors may be added to the wafer-like structure. Examples of a connector include but are not limited to solder ball(s), a ball grid array (BGA), a pin, a surface mount pad, epoxy, etc.

In some example embodiments, one or more steps 2102, 2104, 2106, 2108, and/or 2110 of flowchart 2100 may not be performed. Moreover, steps in addition to or in lieu of steps 2102, 2104, 2106, 2108, 2108, and/or 2110 may be performed. Further, in some example embodiments, one or more of steps 2102, 2104, 2106, 2108, 2108, and/or 2110 may be performed out of order, in an alternate sequence, or partially (or completely) concurrently with other steps.

The next section describes example operational embodiments of non-reciprocal devices disclosed herein.

7. Example Operational Embodiments

Figure 22:
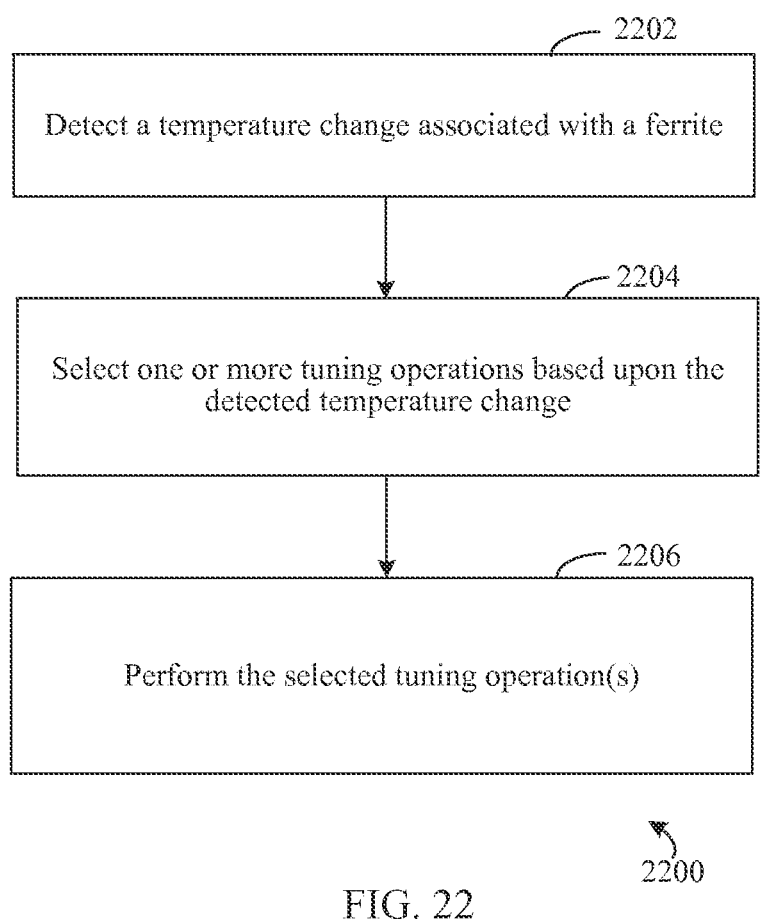
FIG. 22 is flowchart of an example method of an operational embodiment for performing tuning, according to an exemplary embodiment.

The embodiments described herein may perform their functions in various ways. For example, FIG. 22 shows a flowchart 2200 providing example steps for tuning a non-reciprocal device, according to an exemplary embodiment. Non-reciprocal devices and tuning circuits described herein may each operate according to flowchart 2200, in an embodiment. Other structural and operational embodiments will be apparent to persons skilled in the relevant art(s) based on the discussion regarding flowchart 2200. Flowchart 2200 is described as follows.

Flowchart 2200 may begin with step 2202. In step 2202, a temperature change associated with a ferrite is detected. A tuning circuit may include a temperature sensor do detect a temperature change.

In step 2204, one or more tuning operations may be selected based upon the detected temperature change. A tuning circuit may comprise logic or sub-circuits to determine tuning operations to be performed.

In step 2206, the selected tuning operation(s) may be performed. In embodiments, components of a non-reciprocal device or circuitry and devices associated therewith, may perform the tuning operation.

In some example embodiments, one or more steps 2202, 2204, and/or 2206 of flowchart 2200 may not be performed. Moreover, steps in addition to or in lieu of steps 2202, 2204, and/or 2206 may be performed. Further, in some example embodiments, one or more of steps 2202, 2204, and/or 2206 may be performed out of order, in an alternate sequence, or partially, substantially, or completely concurrently with other steps.

The next section describes further example embodiments and advantages of non-reciprocal devices disclosed herein.

8. Further Example Embodiments and Advantages

The embodiments described herein may be applied to the formation, integration, operation, and tuning of non-reciprocal devices such as circulators, isolators, and/or the like. The techniques described herein allow for the integration of non-reciprocal devices into known device manufacturing processes while providing for size and space requirements as well as dynamic operational optimizations. As would be apparent to one skilled in the relevant art(s) having the benefit of this disclosure, the techniques described herein may be applied to any suitable non-reciprocal device. While various embodiments are exemplarily illustrated herein with circulator configurations, it will be recognized that the described techniques are also applicable to other non-reciprocal devices, such as isolators.

It will be recognized that the materials described in embodiments herein, their respective shapes and dimensions, their relative positions shown in the figures, are exemplary in nature. Modifications are contemplated, as would be apparent to one of skill in the relevant art(s) having the benefit of this disclosure.

It will be recognized that the systems, their respective components, and/or the techniques described herein may be implemented in hardware, software, firmware, or any combination thereof, and/or may be implemented as hardware logic/electrical circuitry. The disclosed technologies can be put into practice using software, firmware, and/or hardware implementations other than those described herein. Any software, firmware, and hardware implementations suitable for performing the functions described herein can be used, such as those described herein.

9. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A non-reciprocal device, comprising:
   a ferrite core;
   a plurality of conductors magnetically operable with the ferrite core;
   a first plurality of vias through the ferrite core, each of the plurality of conductors electrically connected to one of the first plurality of vias;
   a substrate that includes a cavity, the cavity being coaxially aligned with the ferrite core; and
   a second plurality of vias in the substrate, wherein each of the plurality of conductors traverses a respective subset of the second plurality of vias.

2. The non-reciprocal device of claim 1, further comprising:
   a reference voltage conductor magnetically operable with the ferrite core;
   wherein the plurality of conductors is positioned along at least a first side of the ferrite core; and
   wherein the reference voltage conductor is positioned along at least a second side of the ferrite core that is opposite the first side.

3. The non-reciprocal device of claim 1, wherein at least one of the plurality of conductors comprises a pattern loop.

4. The non-reciprocal device of claim 1, further comprising:
   a magnetic source configured to be magnetically coupled to the ferrite core.

5. The non-reciprocal device of claim 4, further comprising:
   a metal layer that includes a magnetically responsive metal;
   wherein the magnetic source is positioned along a first side of the ferrite core; and
   wherein the metal layer is positioned along a second side of the ferrite core that is opposite the first side.

6. The non-reciprocal device of claim 4, further comprising:
   a silicon-based layer between the plurality of conductors and the magnetic source, the silicon-based layer configured to adjust one or more operational characteristics of the non-reciprocal device.

7. A communication circuit, comprising:
   a first non-reciprocal device that includes a first port, a second port, and a third port;
   a first amplifier operably coupled to the first port, the first non-reciprocal device configured to have an impedance that is matched to an impedance of the first amplifier;
   an antenna configured to be operably coupled to the second port; and
   a first receiver operably coupled to the third port;
   wherein the first non-reciprocal device includes:
      a ferrite core;
      a plurality of conductors magnetically operable with the ferrite core;
      a first plurality of vias through the ferrite core, each of the plurality of conductors electrically connected to one of the first plurality of vias;
      a substrate that includes a cavity, the cavity being coaxially aligned with the ferrite core; and
      a second plurality of vias in the substrate, wherein each of the plurality of conductors traverses a respective subset of the second plurality of vias.

8. The communication circuit of claim 7, wherein the first amplifier is configured to output a differential signal; and
   wherein the first port is configured to receive the differential signal.

9. The communication circuit of claim 8, wherein the first port includes a center tap.

10. The communication circuit of claim 7, further comprising:
    a first tuning block operably coupled between the first amplifier and the first port, the first tuning block configured to perform further impedance matching between the first amplifier and the first non-reciprocal device.

11. The communication circuit of claim 10, further comprising at least one of:
    a second tuning block operably coupled between the antenna and the second port, the second tuning block configured to perform further impedance matching between the antenna and the first non-reciprocal device, wherein the first non-reciprocal device is configured to have an impedance that is matched to an impedance of the antenna; or a third tuning block operably coupled between the first receiver and the third port, the third tuning block configured to perform an impedance matching between the first receiver and the first non-reciprocal device.

12. The communication circuit of claim 11, further comprising:

a second non-reciprocal device that includes a fourth port, a fifth port, and a sixth port;

a second amplifier operably coupled to the fourth port, the second non-reciprocal device configured to have an impedance that is matched to an impedance of the second amplifier;

a second receiver operably coupled to the sixth port; and a switch operatively coupled to the antenna and configured to selectively provide a connection between the antenna and the second port or between the antenna and the fifth port;

wherein the first non-reciprocal device, the first amplifier, and the first receiver are associated with low band communications which correspond to a first range of frequencies;

wherein the second non-reciprocal device, the second amplifier, and the second receiver are associated with high band communications which correspond to a second range of frequencies; and wherein each of the frequencies in the first range is less than each of the frequencies in the second range.

* * * * *